Dec. 26, 1961 C. E. BEACH 3,014,645

PRINTING MECHANISM FOR FACILITATING DATA CHECKING

Filed Sept. 8, 1954 11 Sheets-Sheet 1

INVENTOR.

C. E. Beach

INVENTOR.
C. E. Beach

INVENTOR.
C. E. Beach

Dec. 26, 1961 C. E. BEACH 3,014,645

PRINTING MECHANISM FOR FACILITATING DATA CHECKING

Filed Sept. 8, 1954 11 Sheets-Sheet 4

INVENTOR.

C. E. Beach

INVENTOR.
C.E. Beach

Dec. 26, 1961 C. E. BEACH 3,014,645

PRINTING MECHANISM FOR FACILITATING DATA CHECKING

Filed Sept. 8, 1954 11 Sheets-Sheet 6

INVENTOR.
C. E. Beach

INVENTOR.
C. E. Beach

PRINTING MECHANISM FOR FACILITATING DATA CHECKING

Filed Sept. 8, 1954

INVENTOR.

C. E. Beach

INVENTOR.
C. E. Beach

INVENTOR.
C. E. Beach

Dec. 26, 1961 C. E. BEACH 3,014,645

PRINTING MECHANISM FOR FACILITATING DATA CHECKING

Filed Sept. 8, 1954 11 Sheets-Sheet 11

INVENTOR.
C. E. Beach

United States Patent Office 3,014,645

Patented Dec. 26, 1961

3,014,645

PRINTING MECHANISM FOR FACILITATING DATA CHECKING

Clarence E. Beach, 70 Prospect St., Binghamton, N. Y., assignor of one-half to Robert Russell Stratton, Gowanda, N.Y.; Marjorie Stratton, executrix of said Robert Russell Stratton, deceased Filed Sept. 8, 1954, Ser. No. 454,717

17 Claims. (Cl. 235—3)

This invention relates to printing mechanism for facilitating data checking; and, more particularly, to means for providing permanent, legible records of accumulations of totals which have been entered in totalizers respectively representative of data of diverse classifications.

In the use of totalizers forming part of various forms of data classifying and computing mechanisms (inclusive of but not limited to cash registers, so-called "collators" and other machines for scanning and/or analyzing cards or other data records) it is frequently needful to compare totals obtained at a given occasion one with another and/or with coresponding totals obtained upon another occasion.

For example, it is very desirable to present and provide, for comparisons, records of departmental and over-all cash register totals in retail stores at stated times; as at the commencement and end of each day, of each week and of each month. Under some circumstances it is correspondingly desirable to provide for comparisons of such totals as have been attained upon an occasion of a visit of an auditor or inspector, with like totals attained at another such occasion.

Thus, in the use of cash registers, of types now available in retail food stores, it is customary for the store manager to send to district or general accounting offices lead pencil or ink transcriptions of figures indicated by the register totalizer mechanism, as he observes them. Errors are frequently made in recording such readings, with resultant confusion and, in many instances, losses result before the errors are discovered and rectified.

It has been found that such errors are particularly frequent in transcriptions made after the close of business days when the managers are fatigued.

It is therefore a very important general object of this invention to provide, in such machines, facilities for simultaneously and compactly inscribing, on suitable cards or sheets, expressions of summations of items which, at the time of such inscription, have been entered into totalizers of such machines.

It is an object of this invention of corresponding importance that structure shall be provided whereby sets of such totalizer summations may be inscribed on given cards, upon different occasions, in relationships which will facilitate comparisons for ascertainments of results of transactions occurring between such occasions.

It will be apparent that, under most circumstances, some comparisons can most readily be made if the latest (and therefore usually the numerically greatest) totals are printed above the earlier (and therefore usually lesser) totalizer sums.

It is therefore a still further object of this invention to provide totals printing and associated mechanisms whereby later totals will assuredly be printed above prior totals when sets of totals are successively printed upon any card.

It is desirable, under many conditions, that indicia indicating the number of transactions which have then occurred will be shown in connection with each printing of departmental and other totals.

Another object of this invention is, therefore, to provide facilities whereby such transaction-number-expressions will be inscribed incident to each printing of totals.

There is an increasing disposition on the part of users of machines of types for which this invention is particularly suited, to provide so-called "micro-film" records which can be compactly stored. In order to facilitate such filming, it is desirable that records of totalizer summations which are inscribed upon a given occasion will be situated in close side-by-side relationship; rather than one after another along a tape.

It is therefore another object of this invention to very compactly inscribe such totals.

Under many conditions of service, it is of distinct importance that the mechanism for assembling and inscribing totals of departmental and over-all transactions shall be inaccessible other than to certain specially authorized persons.

It is therefore an object of this invention to provide a type of totalizing and printing mechanism which is suited for containment in a locked enclosure of moderate size, while leaving various other mechanism features subject to usual maintenance attention.

It is another object to provide, in mechanisms having foregoing characteristics, facilities for utilization of a continuous record sheet upon which will be automatically inscribed all totalizer sums whenever the machine is used for printing records on one or any group of inserted cards or slips.

It is a further object of this invention to prevent printing of records of totalizer conditionings at any time when cash register or other source of totalizer actuation is conditioned for operation, and to prevent such totalizer increment causing equipment from acting so long as the mechanism is conditioned for permitting insertion of cards or record sheets for printing of totalizer conditionings thereon.

Other objects, purposes and aims of this invention, more or less specific than those hereinbefore referred to, will be in part obvious and in part pointed out in the course of the following description of the elements, combinations, arrangement of parts and application of principles, constituting the invention; and the scope of protection contemplated will be indicated in the appended claims.

For the purpose of enabling this invention to be more readily understood by persons skilled in this art, illustrative embodiments of various features thereof are shown in the accompanying drawings and hereinafter described in detail, but this invention, particularly in its broader aspects, is not limited to utilization of all or any of the features so shown and described, except insofar as may be indicated in the claims; and this invention may be practiced with other forms of mechanism, and many changes may be made in construction and arrangement and parts may be added or omitted without departing from the spirit of this invention.

Similar reference characters designate like or corresponding parts throughout the various views, in which.

Figure 1:
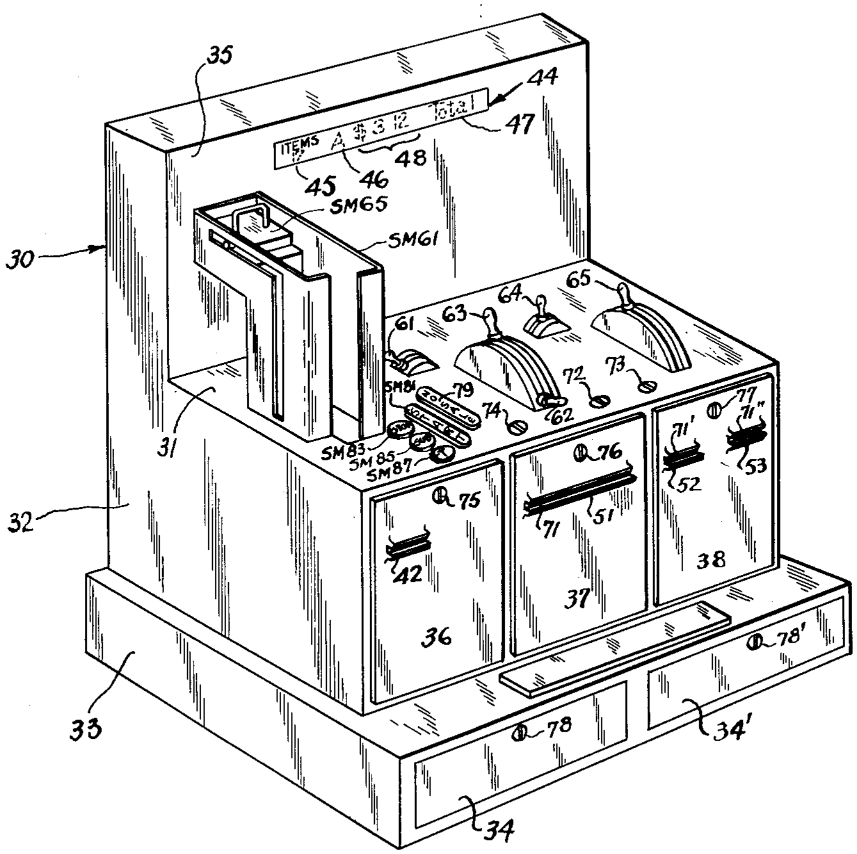
FIGURE 1 shows a cabinet having mounted thereon manually operable portions of mechanism constructed in accordance with certain features of this invention, in association with facilities for scanning data records, which cabinet is suited for containing other portions of such a mechanism.
Figure 7:
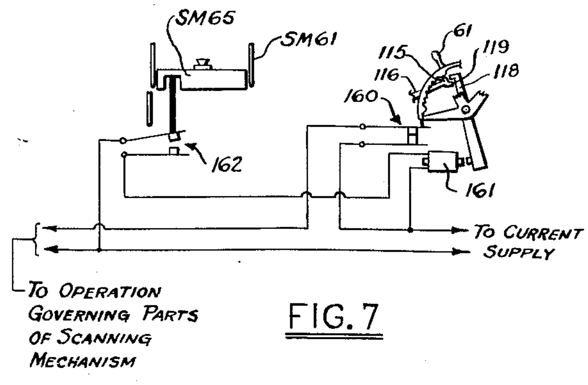
Figure 2:
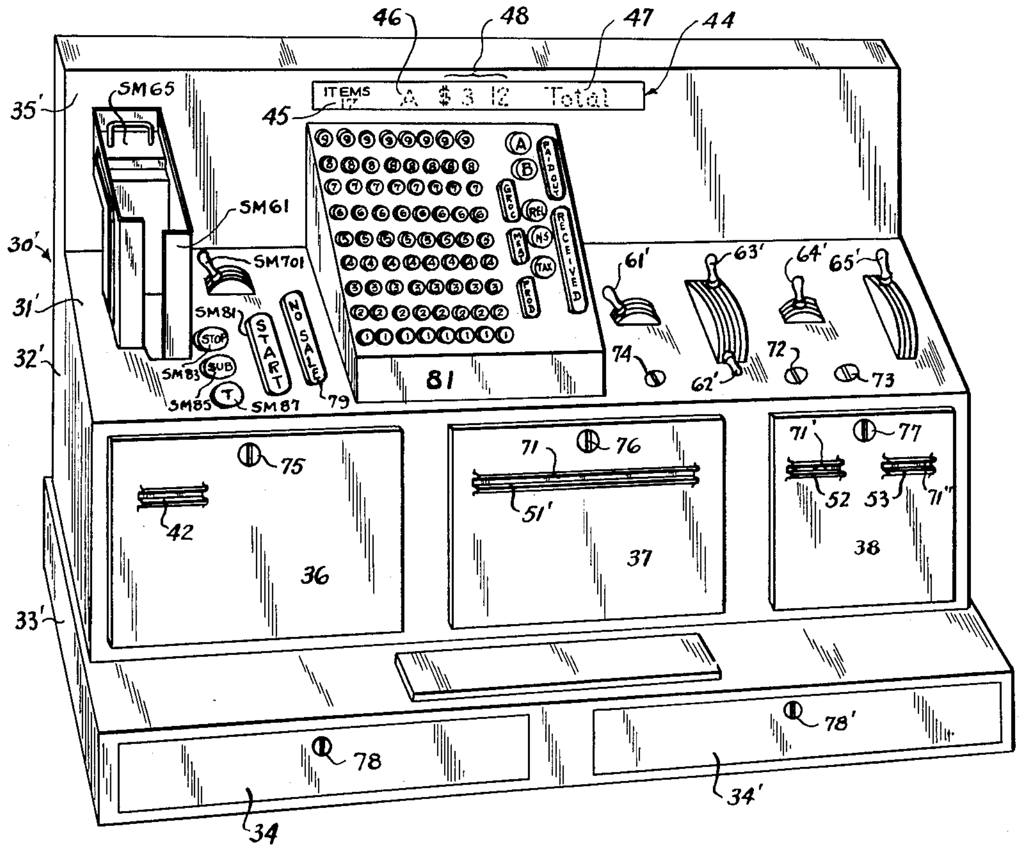
FIG. 2 is a view of a cabinet and mechanism similar to that of FIG. 1, but illustrating a manner of association of a manually operable keyboard therewith.
Figure 8:
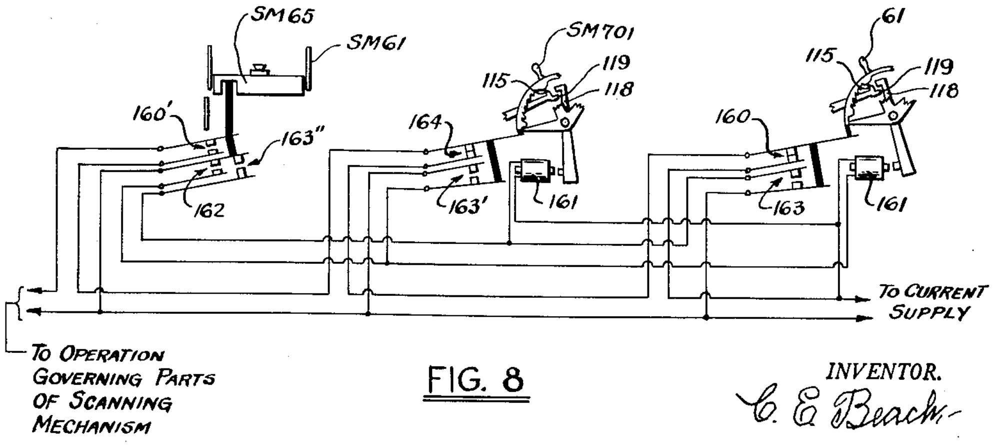
Figure 4:
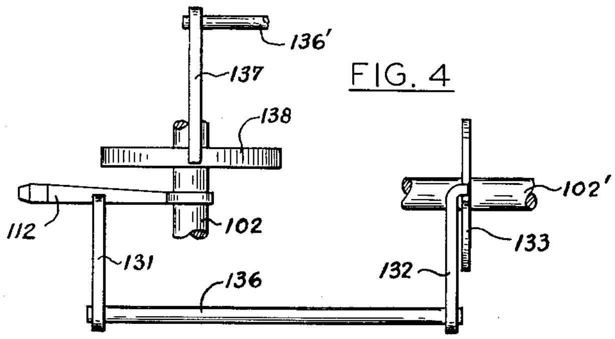
FIG. 4 is a top plan view, partly broken away, showing fragments of certain of the parts of FIG. 3.
Figure 9:
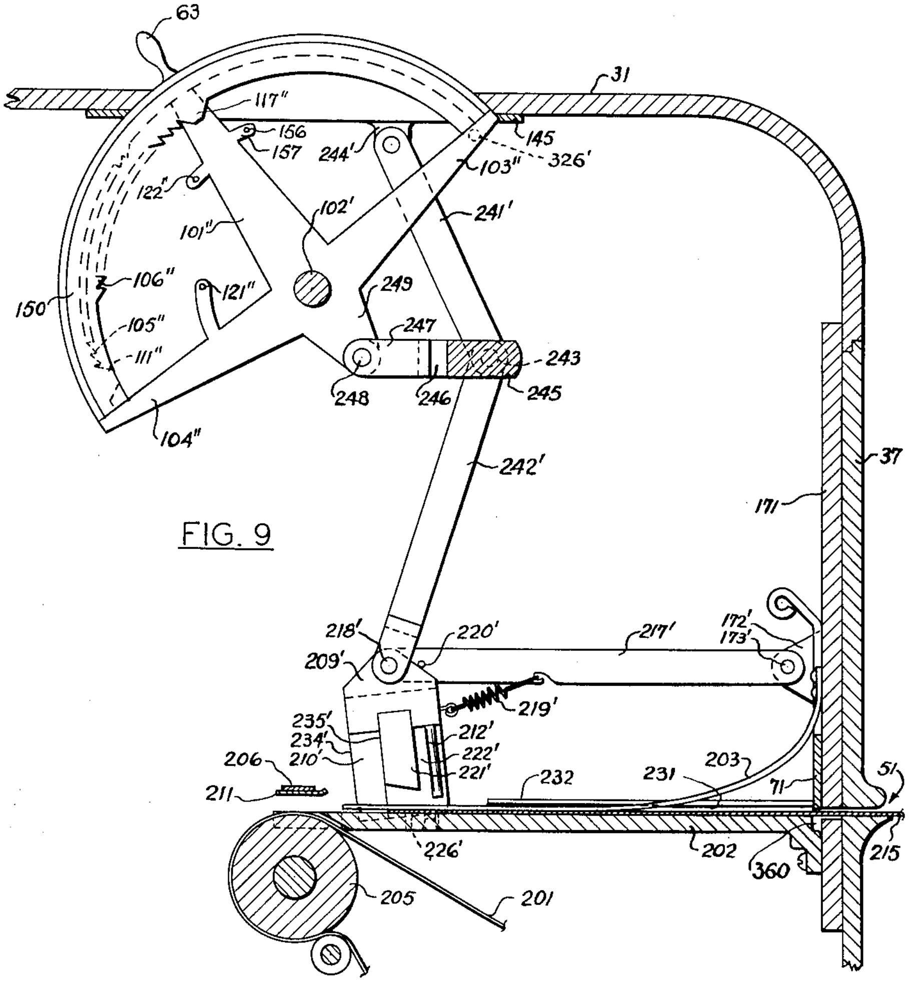
Figure 10:
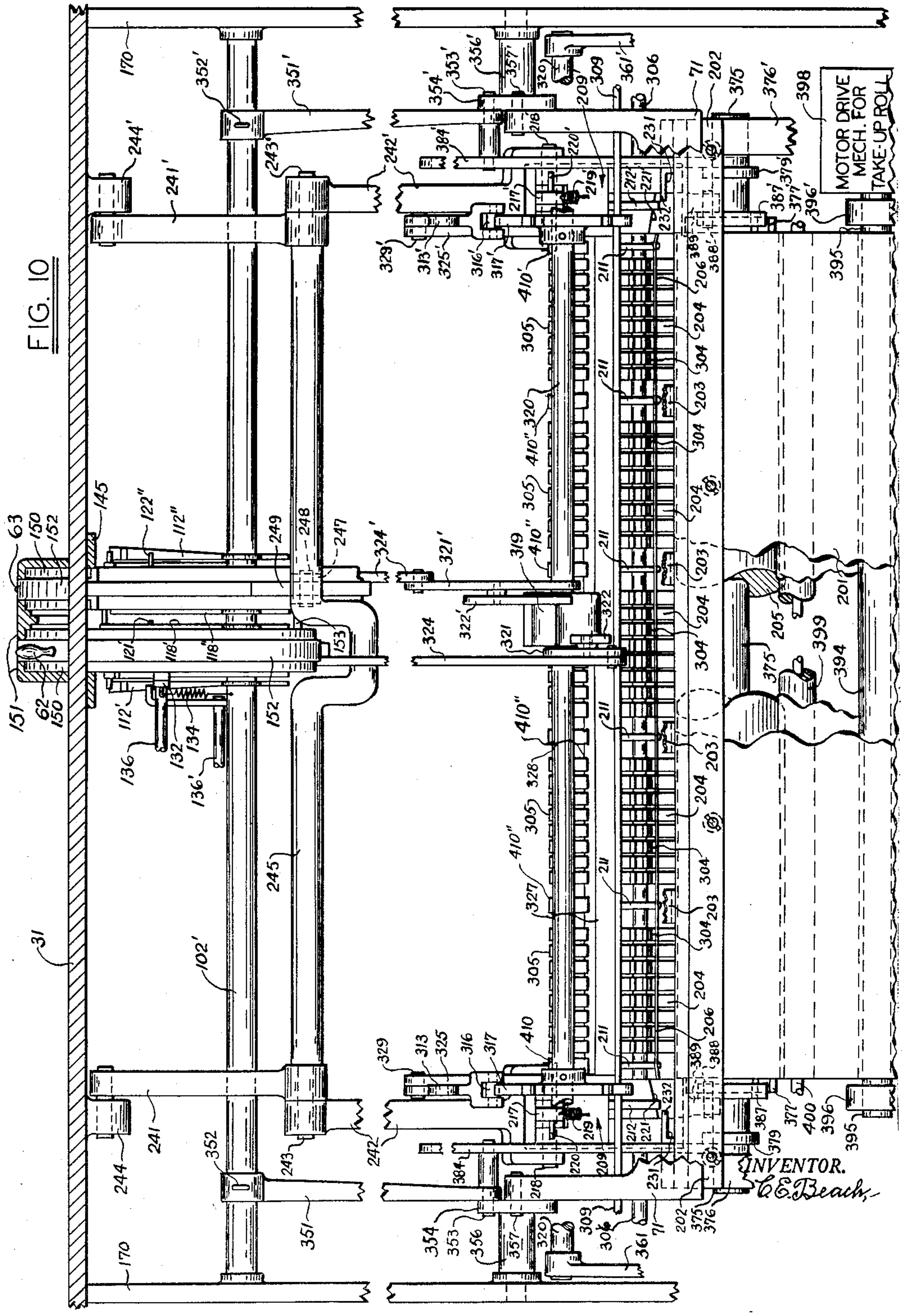
Figure 11:
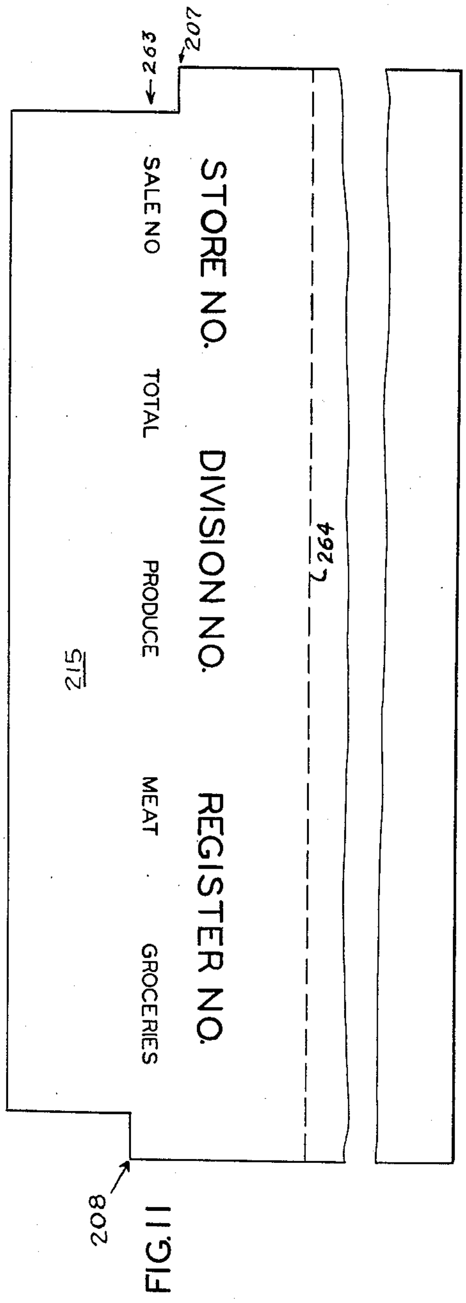
Figure 21:
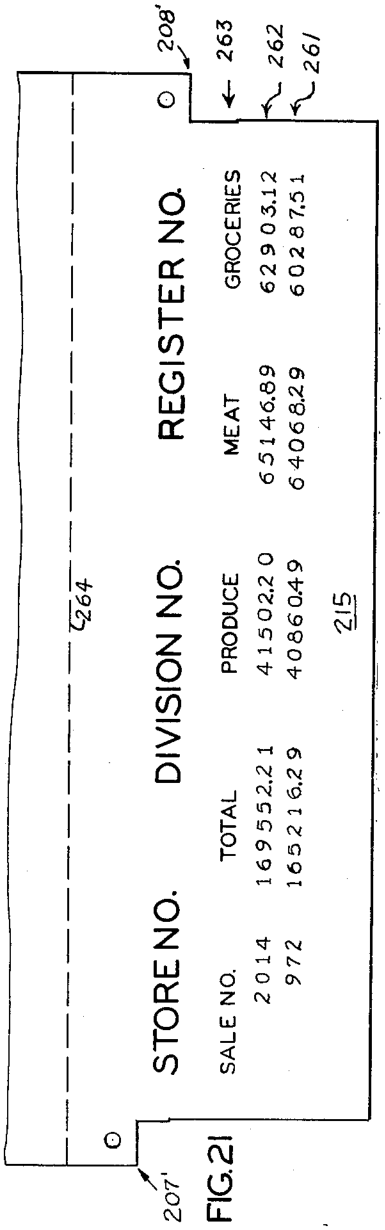
Figure 12:
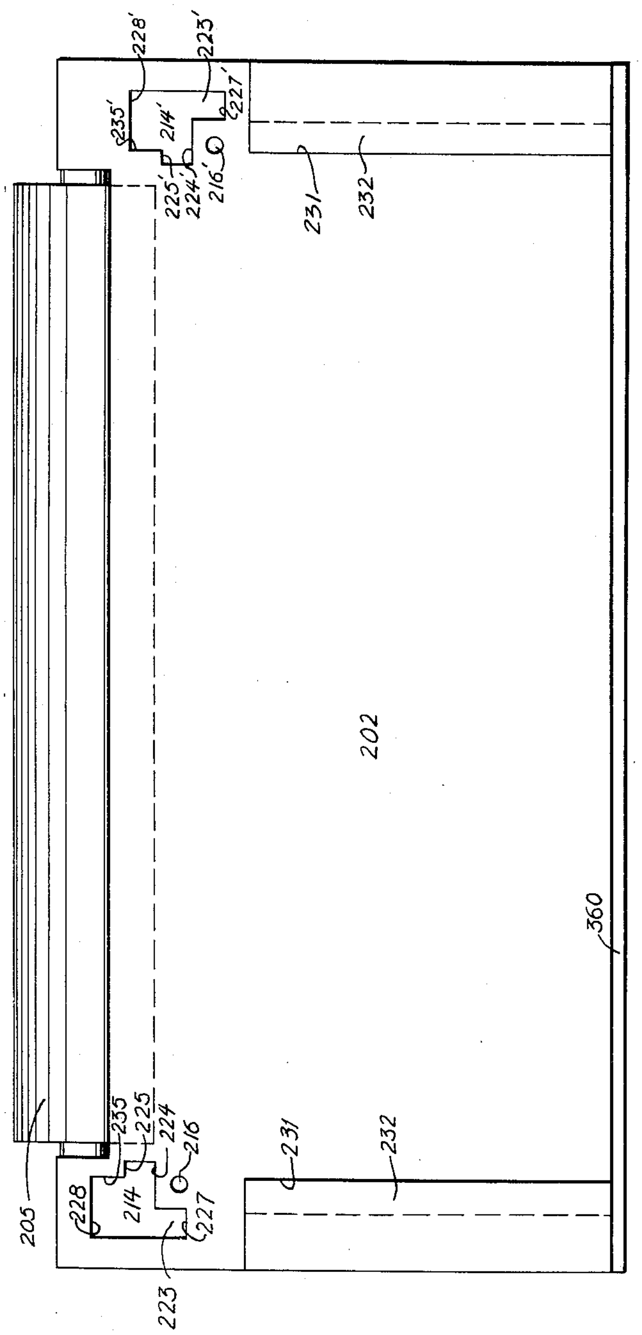
Figure 17:
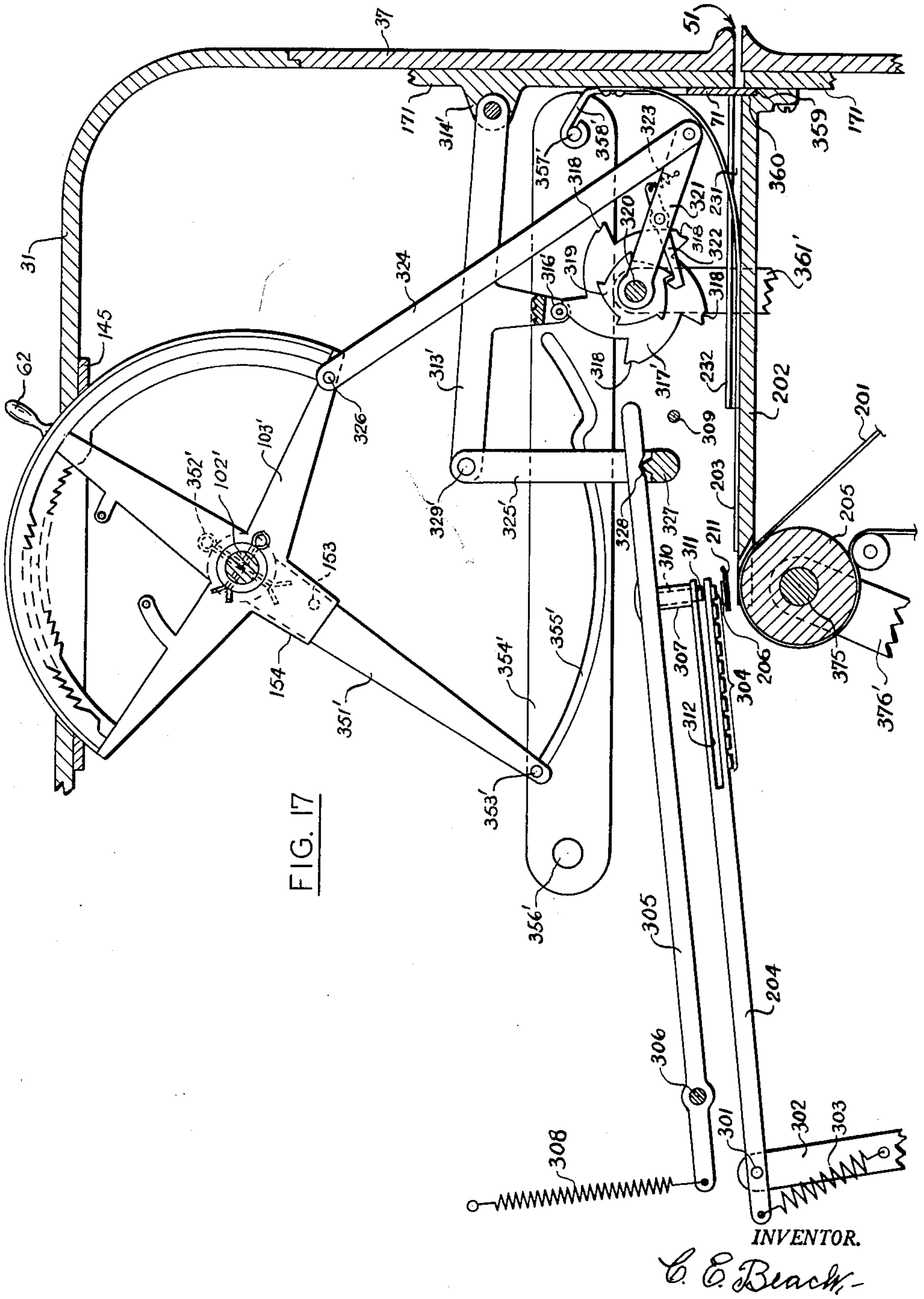
Figure 18:
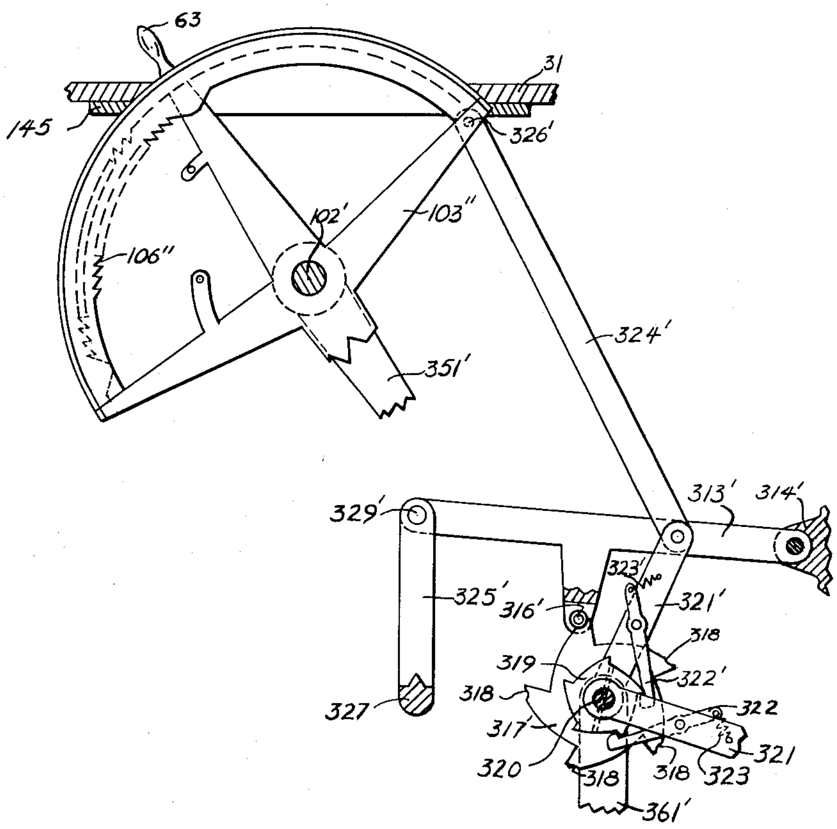
Figure 19:
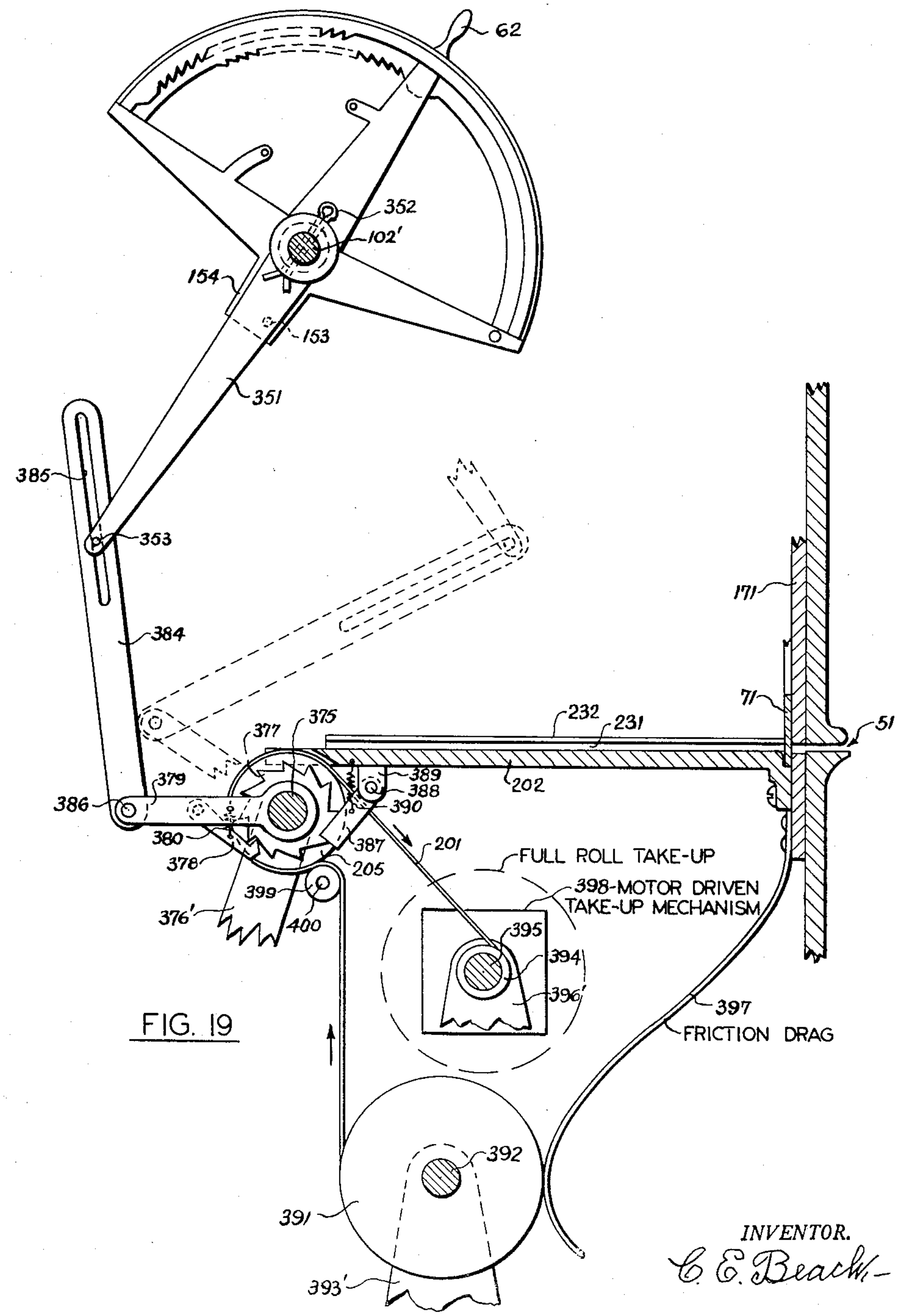
Figure 20:
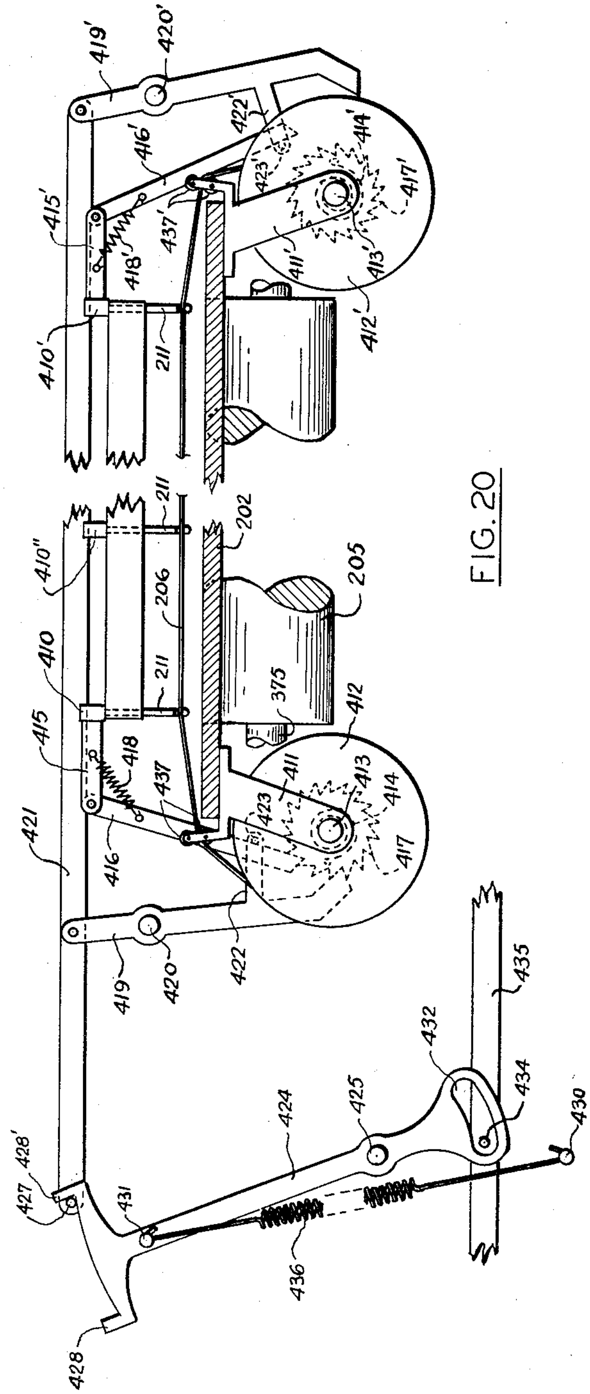

FIG. 7 diagrammatically shows an illustrative arrangement of circuiting and interrelating with scanning mechanism of one of the manually operable parts shown in FIG. 1;

FIG. 8 is a view similar to FIG. 7 showing an illustrative arrangement of circuiting and parts associated therewith for interrelating certain of the manually operable parts shown in FIG. 2 with one another as well as with scanning mechanism;

FIG. 9 is a side elevation, partly in section, showing table for supporting cards which are inserted for printing thereon totalizer summations, together with anchoring and corner cutting mechanism, and further showing continuous paper strip upon which totalizer summations may also be printed;

FIG. 10 is a front elevation of structures shown in FIG. 9, together with printing mechanism, in which some parts are broken away and/or more or less in section;

FIG. 11 shows a record card suitable for use with the mechanism of FIGS. 9 and 10;

FIG. 12 is a broken plan view of the record card supporting table and of the printing platen of FIGS. 9 and 10;

FIGS. 13, 14, 15 and 16 show, mostly in cross section, one of the detent, punching and corner cutting blocks of FIG. 10, at consecutive stages of its operative cycle, together with an associated portion of the table for supporting record cards;

FIG. 17 is a side elevation, partly in section, showing an illustrative one of the digital units of the mechanism of FIG. 10 for printing totalizer summations, together with certain of its actuating parts responsive to one of the manually operable parts of FIGS. 1 and 2, and further showing a shutter for the record-card-admission slot and controlling means for such shutter;

FIG. 18 is a side elevation similar to FIGS. 17, showing parts for effecting actuation of printing mechanism responsive to movements of another of said manually operable parts;

FIG. 19 is a side elevation similar to FIGS. 17 and 18, showing mechanism for advancing the printing platen of FIGS. 9, 10 and 12, together with associated parts;

FIG. 20 is a fragmentary and more or less schematic front elevation of the spools for the ink ribbon of FIGS. 9 and 10, together with actuating mechanism for said spools; and FIG. 21 shows a portion of a record card, such as that of FIG. 1, after two entries have been printed upon such card.

References to prior patents and to copending applications will be hereinafter inserted for the purposes of facilitating, simplifying and clarifying the description of this invention; however, it should be understood that such references are not made in a limiting sense other than in instances which hereinafter specifically state to the contrary, as this invention may be successfully utilized in connection with equipment and mechanisms other than those of such prior patents and copending applications.

For example, this invention may be utilized in connection with Apparatus and Systems for Automatically Recording, Classifying, Totalizing and Auditing Business Transactions such as the apparatus shown in copending application of Robert Russell Stratton et al., Serial No. 159,692, filed May 3, 1950; said Stratton being assignee of an undivided one-half (½) interest in the present invention (now Patent No. 2,746,679, dated May 22, 1956) as well as co-pending application of C. E. Beach et al., Serial No. 364,982, filed June 30, 1953 (now Patent No. 2,759,670, dated August 21, 1956), the disclosures of which patents are made a part hereof by reference.

However, it should be understood that other types of apparatus may be utilized in place of the apparatus so shown, and that apparatus may be used which includes manually operable keyboards on the order of those employed in conventional forms of cash registers, which keyboards may be utilized in place of or to supplement tablet or token scanning mechanism.

Wherever, in designating the placement of any part upon a given occasion, the word "positioning" is hereinafter used, such word should be understood as signifying placement of such part in or not significantly displaced from the designated stage of its intended movement; thus, for example, "right hand positioning" of any part signifies that such part is in or not significantly displaced from the right hand end of its intended functional movement.

In constructing this invention, the entire mechanism may be mounted in or upon cabinets such, for example, as those shown in FIGS. 1 and 2; which cabinets support and contain mechanism for classifying, totalizing and auditing business transactions in a desired manner. Exterior equipment here shown substantially corresponds with that disclosed in said Stratton et al. patents; inclusive of a magazine SM61 in which desired tablets or tokens (not here shown) may be stacked for scanning or sensing, a starting bar SM81, a stop key SM83, a subtotal key SM85 and a final total key SM87; the reference numbers here applied to these parts being similar to those employed for designating corresponding parts in the first aforementioned Stratton et al. patents.

A bar 79, may be provided near the starting bar SM81, for releasing the drawer of the cashier on duty, without use of the starting bar SM81, for a reason which will be hereinafter more fully explained.

Referring more particularly to FIG. 1, the entire mechanism is mounted upon and in a cabinet such as the cabinet 30; which cabinet has a table 31, ends such as 32, a base section 33 containing cash drawers 34, 34'; and a panel 35 extending upwardly from the rear edge of the table 31. The front of said cabinet is equipped with ordinarily closed and locked doors 36, 37 and 38.

A slot 42 is provided in the upper portion of the door 36 through which may issue the usual tape, listing prices of the various items of each purchase.

A window 44 is provided in the panel 35 for display of targets representative of data ascertained through scanning of tablets or tokens stacked in the magazine SM61.

As shown, a target or targets 45 display the number of items in a sale, a target 46 designates the cashier on duty, and a target 47 near the right hand end of the window 44 indicates whether the sub-total or final total of the item prices of a sale is being displayed, which sum is expressed by the targets 48.

A comparatively wide slot 51 is provided in the door 37 for receiving a card upon which attained sums or totals of various classifications may be printed, and slots 52 and 53 may be provided in the door 38 for alternative availability for receiving cards of one cashier or another for purposes which will be hereinafter more fully explained.

A conditioning handle 61 is ordinarily positioned at the left hand end of its swing, where it points in the general direction of the magazine SM61, thereby indicating that the mechanism is conditioned for use in scanning tablets or tokens stacked in said magazine, subject to the governing mechanism comprising the starting bar SM81, and to the buttons SM83, SM85 and SM87.

During right hand positioning of said handle 61, the machine is rendered unresponsive to the scanning mechanism and to the governing bar and buttons associated therewith.

Admission of cards through the slot 51, and printing of attained sums of the totalizers of various classifications on cards so inserted is governed by handles 62 and 63; the handle 62 being shown in extreme forward positioning and the handle 63 in extreme rearward positioning.

As hereinbefore mentioned, FIG. 1 shows handles 61, 62, 63, 64 and 65 projecting above the table 31, and corresponding handles, together with the handle SM701, as projecting above the table 31' of FIG. 2.

Figures 3, 5, 6:
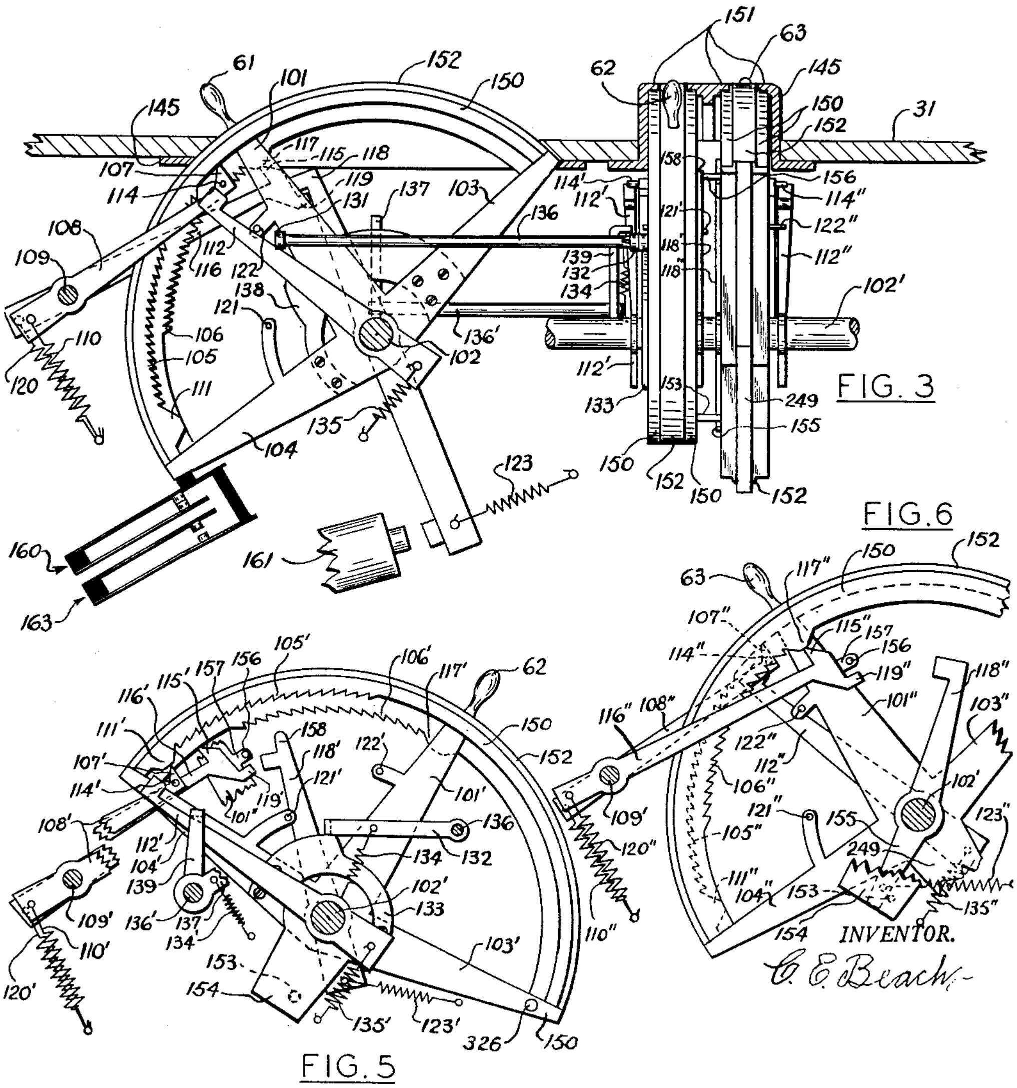
FIG. 3 is a fragmentary front elevation illustrative of mechanism functionally interrelating and for preventing actuations of less than full intended cycles of manually operable parts such as shown in FIGS. 1 and 2.
FIGS. 5 and 6 are left hand side elevations showing structures associated with certain manually operable parts of FIG. 3, some portions being more or less broken away.

Said tables carry housings such as 145, which are best shown in FIG. 3.

Associated with respective ones of said handles, there are segmental strips 150, extending between their associated arms 103 and 104 and past their associated arms 101; said strips extending beneath the overhanging portions 151 of the housings 145 so as to form a snug connection therebetween; whereby to exclude dust and other foreign matter from the interior of the mechanism, and to prevent insertion of wires or implements which might otherwise be utilized in attempts to alter attained settings of the totalizers.

As best shown in FIG. 3, each of the segmental strips 150 preferably comprises a central raised portion or rib 152 which is situated between the edges of the overhanging housing portions 151.

In constructing a machine embodying this invention, structure is provided which may be termed "interacting mechanism" or "interlocking mechanism." In the embodiment of this invention which is hereinafter described in greater detail and is shown in the accompanying drawings, such structure comprises components of forms and inter-relationships as follows:

A first component embodies means for preventing initiations of actuations of associated sensing or scanning mechanism at times when the machine is conditioned for receiving cards upon which attained sums or totals of various classifications may be printed. For attaining this result, the contacts 160 are associated with a part moving with the handle 61 and with the path which supplies current for operating the governing parts of scanning mechanism so associated therewith, such, for example, as that more fully described in the aforesaid Patent No. 2,746,679, as by manual actuation of a part such as the starting bar 81 particularly shown in FIGS. 7, 11 and 15 of said patent. Said contacts 160 are so associated with a part moving with said handle 61 that such current supply path will be closed only when said handle is in or not displaced to a significant extent from its usual left-hand or unactuated position.

A second component embodies means rendered effective during operation of the sensing or scanning mechanism for preventing conditioning of the machine for such actuation thereof as would permit introduction of aforesaid cards and such as would cause printing of data during operating of the sensing or scanning mechanism. For attainment of this result, a tooth 115 is formed at the free end of the arm 116, and a spring 120 urges said arm to carry said tooth into the path of the teeth of the segment 106 which moves with the handle 61 to at times thereby prevent a significant extent of movement of said handle away from its usual left hand position. When the handle 61 is in said left hand position, a projection 117 holds the tooth 115 out of the path of the teeth of the segment 106 and, while said tooth is so held, the upper end of the latch 118 may be moved by its spring 123 into the path of the lug 119 (which lug moves with said tooth 115), for preventing movement of the arm 116 (responsive to its spring 120) to a position such that said tooth 115 could engage teeth of the segment 106.

A magnet 161 is provided for so moving said latch 118 against the urge of its spring 123 as to permit the arm 116 to carry the tooth 115 into the path of the teeth of the segment 106. The energization of said magnet is governed by contacts associated with associated scanning mechanism (e.g., the contacts 162 shown in FIG. 7) so that said magnet will be energized during operation of the scanning mechanism and will therefore move the latch 118 so that its upper end will be withdrawn from the path of the lug 119, thereby to permit the arm 116 to be moved by its spring 120 to carry its projection 117 into the path of the teeth of the segment 106, should movement of the handle 61 then withdraw the projection 117 from the path of said tooth 115; thereby to prevent a significant extent of movement of the handle 61 away from its usual left hand position.

A third component embodies means operable for permitting introduction of aforesaid cards and for causing preliminary printing of data only when the means of said second component has been abnormally conditioned.

For attainment of this result, structure is associated with the handle 62, which structure comprises the projection 111', the teeth of the segment 105', the tooth 115', the latch 112', and the pin 114', which parts serve in place of similar parts associated with the handle 61, as hereinbefore just explained in greater detail. The track 138 which moves with the handle 61, acts through the arm 137, the shaft 136' and the arm 104', to hold the latch 112' out of the path of the pin 114' against the urge of the spring 135'. The cooperation of such parts being such that said latch 112' will act through the pin 114' to prevent the arm 108' from carrying the tooth 107' into the path of the teeth of the segment 105' only when the handle 61 is in or not displaced to a significant extent from its actuated or right hand position; as it is only when said handle 61 is in such position that the track 138 is so placed that the upper bent over end of the arm 139 (which end is best shown in FIG. 3) permits said latch 112' to engage the pin 114' and thereby prevent the tooth 115' from being moved into the path of the teeth of the segment 105'; the handle 62 being therefore retained in its ordinary forward position at all times except when the handle 61 is in its extreme right hand position.

A fourth component embodies means operable for effecting seizing and cutting away portions of leading edges of aforesaid cards, after such cards have been introduced and suitably positioned for printing data thereon, and thereupon printing data upon such cards, only after the means of said third component has been so conditioned as to permit introduction of such cards.

For attainment of this result, structure is associated with the handle 63, which structure comprises the projection 117'', the teeth of the segment 106'', the tooth 115'', a latch 118'', and the lug 119'', which parts serve in place of parts (designated by similar numbers) which are associated with the handles 61 and 62, as hereinbefore described in greater detail. The pin 153 which moves with the handle 62 engaging the lower end of the latch 118'' to thereby hold the upper end of said latch out of the path of the lug 119'' at all times except when the handle 62 is in its rear or actuated position; the handle 63 being therefore retained in its ordinary rear position at all times except when the handle 62 is in its rear position.

A fifth component embodies means for preventing restoration to usual conditioning of the means of the third component, from its operated condition other than when the means of the fourth component is in unoperated condition; the handle 62 being therefore retained in its actuated rear position at all times except when the handle 63 is in its usual rear position.

For attainment of this result, structure is provided comprising the projection 117', the teeth of the segment 106', the tooth 115', the latch 118' and the pin 121'', which parts serve in place of parts (designated by similar numbers) which are associated with the handles 61 and 63, as hereinbefore described in greater detail.

A sixth component embodies means for preventing restoration to usual conditioning of the means of the second component, from its operated condition, other than when the means of the third component is in unoperated condition.

For attainment of this result, structure is provided comprising the projection 111, the teeth of the segment 105, the tooth 107, the latch 112 and the pin 114, which parts serve in place of parts (designated by similar numbers) which are associated with the handles 62 and 63 as hereinbefore described in greater detail; together with the track 133 which moves with the handle 62, acting through the arm 132, the shaft 136 and the arm 131, to hold said latch 112 out of the path of the pin 114 against the urge of the spring 135, so that when the handle 61 is in its right hand or actuated position, it can be moved to its usual left hand position only when the handle 62 is in its ordinary forward position.

The shutter 71 (FIG. 17) is so associated with the handle 62 that, when this handle is in its rearward position, said shutter is withdrawn from the slot 51, and when this handle is in its usual forward position said shutter will cover said slot; the interconnection of these parts being such that, if the shutter 71 is prevented from fully closing the slot 51, by accidental or malicious obstruction, or other cause, the handle 62 will be locked against movement to its usual forward positioning and, hence, the handle 61 will be locked against movement away from its right hand positioning; thereby then preventing the use of the scanning mechanism associated with the magazine SM61.

Referring again to FIGS. 1 and 2, the handle 64 is movable to the left when the machine is to be conditioned for use by the cashier whose cards are to be inserted in the slot 52 (as, for example, cashier "A"); and right hand positioning of said handle 64 correspondingly conditions the mechanism for use by cashier "B" whose cards may then be inserted through slot 53.

Handle 65 governs printing of sums of items of whichever cashier is indicated by positioning of the handle 64, in a manner corresponding to the control by handle 63 for printing upon cards inserted through slot 51.

Locks 72 and 73 govern positionings of the handle 64, so that in order to move this handle to the left, an intended key must be inserted and turned in the lock 72, and in order for this handle to be moved to its right hand positioning, lock 73 must be correspondingly actuated.

A lock 74 correspondingly governs the positioning of handle 61, so that this handle cannot be moved from left to right other than when lock 74 has been operated.

Locks 75, 76 and 77 are provided for holding closed the doors 36, 37, 38, respectively; and the usual locks 78 and 78' are provided for the cash drawers 34, 34'.

Referring now to FIG. 2, it will be observed that a cabinet 30' may be substituted for cabinet 30 shown in FIG. 1 when it is desired to provide a manually operable keyboard for use alternatively with scanning mechanism associated with a magazine such as SM61. The manually operable parts of FIG. 1 thus far described are also here shown as supplemented by a keyboard mechanism 81 similar to that described in first aforementioned Stratton et al. patents, and an additional handle SM701 is provided for rendering the classified totalizing mechanisms alternatively responsive to the scanning facilities provided in connection with the magazine SM61 or to the keyboard mechanism 81.

The mechanism whereby the handle SM701 may alternatively render operable the keyboard mechanism 81 or the scanning mechanism associated with the magazine SM61, generally corresponds with that more fully described in the first aforementioned Stratton et al. patents, and certain of the details thereof are therefore not shown in the accompanying drawings or hereinafter more fully described.

The mechanism and structure provided in association with the handles 61, 62 and 63, as provided on the cabinet 30 shown in FIG. 1, will be most readily understood by referring to FIGS. 3, 4, 5 and 6, which show certain of the parts of such mechanism in more or less schematic relationships.

The mechanism associated with said handles 61, 62 and 63 serves to assure that when a significant extent of movement of any of these handles in a given direction is once accomplished, such handle may not be moved in the opposite direction, until movement thereof in the direction first started has been continued to the end of its intended stroke.

Referring particularly to FIG. 3, it will be seen that the group of arms 101, 103 and 104 are pivoted at 102, and are associated and move with the handle 61. As best shown in FIGS. 5 and 6, similar sets of arms 101', 103', 104' and 101'', 103'', 104'', are pivoted at 102' and are correspondingly associated with the handles 62 and 63, respectively.

It should be kept in mind that parts directly associated with the handle 62, as well as fragments of parts responsive to and governing movements of the handle 61, are shown in FIG. 5 as if viewed from the left of FIG. 3; and that fragments of certain parts of the structure moving with the handle 63, are therefore shown in FIG. 5 is located behind all the parts which move with the handle 62. Correspondingly, in FIG. 6, parts are shown as if viewed from the left of FIG. 3.

Internally toothed segments 105 and 106 are carried by the arms 101, 103, 104; and corresponding segments 105', 106', and 105'', 106'' are similarly carried by the arms 101', 101'' associated with the handles 62 and 63, respectively; the segment 105' is to the left of the segment 106' (being therefore shown in FIG. 5 by solid lines), while the segment 105'' is situated to the right of the segment 106'', being therefore shown in FIG. 6 by dotted lines.

Internal ratchet teeth are formed in the segments 105 and 106 for cooperation with the dog teeth 107 and 115, which dog teeth are situated at the free ends of the dog arms 108 and 112, respectively. Said arms are pivoted at 109 and the springs 110 and 120 urge said arms to swing the dog teeth, carried thereby into the paths of the teeth of their respectively associated segments.

The teeth of the segment 105 are formed so as not to oppose movement of the handle 61 from left to right, and to oppose such movement in the opposite direction.

A projection 111 is brought into the path of the tooth 107 when the arm 101 is in its extreme right hand positioning, to thereby act through the tooth 107 for causing the arm 108 to move to a position in which said tooth is out of the path of the ratchet teeth of the segment 105.

A latch 112 is pivoted at 102 for movement independently of the structure moving with the handle 61. A projection extends laterally from the upper end of this latch, for cooperation with said pin 114.

The relationship between said latch-projection and said pin 114 is such that, when the projection 111 has swung the tooth 107 out of the path of the teeth of the segment 105 (as when the handle 61 is in its extreme right hand position), said pin 114 will be below the path of said latch-projection, thereby to permit said latch 112 to move (responsive to its spring 135) to its latching position. When said latch is in its said latching position, its said projection is situated in the path of upward movement of said pin, thereby to prevent an extent of such movement sufficient to enable the arm 108 to carry the tooth 107 into the path of the teeth of the segment 105; hence, the handle 61 may then be freely swung from its right hand to its left hand position.

From the foregoing it will be further evident that when the handle 62 is in other than its usual forward position the track 133 will permit the arm 132 to move in response to its spring 134, and thereby rotate the shaft 136 so as to cause the arm 131 to swing the latch 112 to a position which withdraws its lateral projection from the path of the pin 114; with the result that movement of the handle 61 from its extreme right hand position will then be restricted to an extent merely sufficient to withdraw the projection 111 from the path of the tooth 107, whereupon the spring 110 will cause the arm 108 to so move that left movement of the handle 61 will be arrested when the tooth of the segment 105 nearest said projection 111 is brought into engagement with the tooth 107. However, when the handle 62 is in its usual forward position, said latch 112 will be permitted to move responsive to its spring 135 to a position which will, by obstructing the path of the pin 114, prevent the tooth 107 from being moved into the path of the teeth of the segment 105, so that the handle 61 may then be freely moved from its right hand to its left hand position.

The segment 106 has ratchet teeth pitched in the opposite direction from those of segment 105, for engagement by a tooth 115 which is carried bythe arm 116, when said arm is moved responsive to the spring 120, for at times preventing movement of handle 61 from left to right (as viewed in FIG. 3).

For convenience of illustration, the segments 105 and 106 are shown at different distances from the pivot 102; however, inasmuch as these segments may be separately produced, and then attached to the arm 101, the teeth of these segments may be equidistant from the pivot 102 around which they rotate.

A pin 121 is carried by an extension from the arm 104, and is so positioned that it will be brought against the latch 118 when the handle 61 is in its extreme right hand position (as viewed in FIG. 3), so that this latch will then be withdrawn from the path of the lug 119 and thereby permit the arm 116 to be moved by its spring 120 to carry the tooth 115 into the path of the ratchet teeth of the segment 106.

However, engagement between such teeth will not prevent movement of the handle 61 from right to left, because the directions of the slants of the faces of the ratchet teeth of said segment 106 and of said tooth 115 is such that their engagement will not prevent movement of said handle 61 from right to left, although such engagement will prevent movement of said handle from left to right, after any of such segment teeth have passed to the left of the tooth 107, until after said handle has moved to the left sufficiently to bring the projection 117 into engagement with the tooth 115, and thereby move said tooth out of the path of the teeth of the segment 106, thereby to so position the arm 116 that the latch 118 may engage the lug 119.

Correspondingly, a pin 122, carried by an extension from the arm 101, is so situated that when said arm is in its extreme left hand position (as viewed in FIG. 3), said pin 122 will move the latch 112 out of the path of the pin 114, so as to no longer prevent the arm 108 to move responsive to the spring 110, so as to carry the tooth 107 into the path of the teeth of the segment 105.

From the foregoing, it should be clear that parts are provided whereby the teeth 107 and 115 may be held out of the paths of the teeth of the respectively associated segments 105, 106, to thereby permit uninterrupted movements of the handle 61 from end to end of its intended travel.

The latch 112 is not only subject to actuation in one direction by the pin 122 when the handle 61 is in its extreme left hand position, but this latch is also subject to actuation by an arm 131 (see also FIG. 4), which arm is fixed on shaft 136, upon which shaft the arm 132 is also fixed.

The bent-over free end of the arm 132 rides the track 133 which moves with the handle 62; and a spring 134 urges said arm 132 toward said track.

The relationship of these parts is such that so long as the handle 62 is in its extreme forward position, the latch 112 may move in response to its spring 135 to prevent movement of the arm 108 responsive to its spring 110 such as would carry the tooth 107 into the path of the ratchet teeth of the segment 105; but, as soon as the handle 62 is moved away from its extreme forward position, the indented portion of the track 133 will be in the path of the free end of the arm 132, thus permitting said arm to move in response to its spring 134. Such movement of the arm 132 will be transmitted through the shaft 136 to the arm 131, and said arm 131 will therefore cause the latch 112 to be withdrawn from the path of the pin 114. As a result of this withdrawal, the spring 110 will act through the arm 108 to carry the tooth 107 into the path of the ratchet teeth of the segment 105 whenever attempt is made to move the handle 61 from its extreme right hand position; thereby preventing such movement of said handle to an extent more than that which is sufficient to bring the left hand one of the ratchet teeth of segment 105 against the tooth 107.

Correspondingly, the latch 118 is not only subject to actuation in one direction by the pin 121, when the handle 61 is in its extreme right hand position, but this latch is also subject to corresponding actuation responsive to energization of the electromagnet 161 (see also FIG. 7), which electromagnet is subject to energization incident to presence of a tablet or token in the magazine SM61, so that if an attempt is made to move the handle 61 from left to right during such tablet or token presence, the resultant energization of said magnet will cause the latch 118 to be moved out of the path of the lug 119, so that, when the projection 117 is withdrawn from the tooth 115, the spring 120 will cause the arm 116 to carry the tooth 115 into the path of the ratchet teeth of the segment 106.

Figure 15:
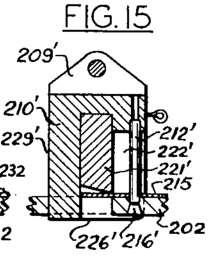

It should be understood that the use of a magnet, such as 161, is herein suggested in a schematic sense, and that other means, either electrical or mechanical, may be utilized for preventing movement of the handle 61 away from its left hand position when there is a tablet or token in the magazine SM61 or during activity of the aforesaid scanning mechanism; for example, the movement of said handle, and its associated parts, from usual left hand positioning may be directly blocked by positioning of an armature of the magnet 161, without affecting the latch 118, by the use of an arrangement analogous to that shown in FIG. 15 of the drawings of the first named aforesaid Stratton et al. patents.

These contacts may be used to control the operation of the aforementioned scanning mechanism in a manner analogous to the use of the contacts 761 shown in FIG. 15 of the first named aforesaid Stratton et al. patents.

The mechanisms associated with the handles 62 and 63 for governing their movements, are similar to those provided for like purposes in association with the handle 61, other than in respects as follows:

The segment 105′ is situated in the left-hand portion of the structure moving with the handle 62 (as it would be viewed in FIG. 3), and the arm 108′ and its tooth 107′ are situated to the left of the structure moving with said handle, and are therefore shown in FIG. 5 as in front of other parts. Correspondingly, the segment 106″ is situated to the left of the segment 105″ (as it would be viewed in FIG. 3), and the arm 116″ is situated to the left of the structure moving with the handle 63 (as it would be viewed in FIG. 3) and is therefore shown in FIG. 6 as in front of other parts associated with the handle 63.

The arms 137 and 139 (FIGS. 3 and 4) are fixed upon the shaft 136′. A track 138 moves with the handle 61, and is situated in the path of the free end of the arm 137.

The bent-over end of the arm 139 is in the path of the latch 112′; and a spring 134′ urges the arm 137 toward the track 138.

The formation and positioning of parts is such that the cam surface of the track 138 will act through the arm 137, the shaft 136′ and the arm 139 to cause the latch 112′ to be withdrawn from the path of the pin 114′ carried by the arm 108′, whenever said handle 61 is in other than its extreme left hand position, to the end that the arm 108′ will be free to move responsive to the spring 110′ to carry the tooth 107′ into the path of the first ratchet tooth of the segment 105′, thereby to prevent significant rearward movement of the handle 62.

As best shown in FIG. 6, the latch 118″, which is associated with the lug 119″ carried by the arm 116″, is governed by a pin 121″ moving with the handle 63 in a manner corresponding to the similar parts associated with the handles 61 and 62.

The segment 106′, tooth 115′ cooperating therewith, and the arm 116′ which carries said tooth, are situated on the right hand side of the structure moving with the handle 62 (as viewed in FIG. 3) for governing movement of said handle from its rear to its forward positioning.

A pin 156 is carried by a projection 157, which extends from the arm 101″. This pin is situated far enough from the shaft 102′ to pass beyond the free end of the latch 118″.

A lug 158 is in the path of, and to the right of the pin 156 (as shown in FIG. 5) so that, whenever the handle 63 has been moved away from its extreme rearward position, the latch 118′ will be swung away from engaging relationship with the lug 119′ carried by the arm 116′. Because of this, the tooth 115′ will serve to prevent significant forward movement of handle 62 at all times other than when the handle 63 is in its extreme rearward positioning.

For governing the movement of handle 63 from its forward to its rearward positioning, parts are provided at the right hand side of the structure moving with said handle (as viewed in FIG. 3) comprising the segment 105″, the tooth 107″, and the arm 108″.

From the foregoing it will be evident that, so long as the handle 61 is in its left hand position, the handle 62 will be held against significant rearward movement; and, hence, the handle 63 will be held against significant forward movement.

It will also be evident that, so long as the handle 61 remains in its left hand position, the contacts 160 (see FIG. 7) will be closed and, hence, the scanning mechanism associated with the magazine SM61 may be utilized, as desired.

So long as there is at least one tablet or token in said magazine, closure of the contacts 162 will cause the magnet 161 to be energized, thereby effecting withdrawal of the latch 118 associated with the handle 61 from the path of the lug 119, so that in the event of any attempt to then move the handle 61 toward the right, the resultant movement of the projection 117 out of the path of the tooth 115 will permit the spring 120 to cause the arm 116 to carry said tooth 115 into the path of the ratchet teeth of the segment 106, thereby to prevent significant movement of said handle 61 away from its left hand position.

At times when no tokens are in the magazine SM61, opening of the contacts 162 will cause the magnet 161 to be de-energized, so that said magnet will not prevent movement of the latch 118, responsive to the spring 123. Hence, insofar as the magnet 161 is concerned, the latch 118 will then be free to engage the lug 119 moving with the arm 116 to prevent the tooth 115 being carried into the path of the teeth of the segment 106.

When the handle 61 is moved to the right, the first result will be opening of the current path through the contacts 160, thereby rendering inoperative the scanning mechanism.

When the handle 61 has been moved to right hand positioning, as just described, the support of the track 138 will be withdrawn from the arm 137, best seen in FIGS. 3 and 5 so that said arm may respond to the urge of the spring 134, acting through the shaft 136′ to bring the arm 139 to a position permitting the latch 112′ to move into the path of the pin 114′, in order that rearward movement of the handle 62 may thus be permitted.

The external equipment shown in FIG. 2 differs from that shown in FIG. 1 and hereinbefore described in greater detail, principally in that it includes a handle SM701 for accomplishing results similar to those attained by the handle 701 shown in FIG. 15 of the aforesaid first named Stratton et al. patents, thereby to render the totalizing mechanism alternatively responsive to the scanning or analyzing mechanism governed by tokens or tablets stacked in the magazine SM61 or to the manual keyboard 81.

The interrelationship between the handle SM701 and the handle 61 of FIG. 2 is shown in greater detail in FIG. 8; in which it will be seen that the electromagnet 161 is connected for energization either responsive to closure of the contacts 162 governed by presence of tokens in the magazine SM61 or by the contacts 163′ governed by the handle SM701.

The contacts 163′ and 164 are associated with the handle SM701 in a manner such that said contacts 163′ are separated and said contacts 164 are closed only when said handle SM701 is in its extreme left hand positioning.

Said contacts 163 control a current path for energization of the magnet 161 associated with the handle 61, and said contacts 164 control the current path for operation of the scanning mechanism.

Said handle SM701 also involves parts (not here shown) for governing mechanism of the keyboard 81, in a manner such as illustratively shown in FIG. 15 of the first named aforesaid Stratton et al. patents, to the end that the finger keys cannot be significantly moved other than when said handle is in its right hand positioning and so that this handle cannot be moved from its right hand positioning during actuated positioning of any one or more of said keys.

Partitions or walls such as 170, 170 (of FIG. 10) are provided in the cabinets 30, 30′ at respective sides of the area covered by the doors 37, 37′, and all total classifying and printing equipment and the table structure 202 associated with the manually operable controlling mechanism therefore is situated between said walls. However, the totalizing equipment for disclosing transaction sub-totals and totals (as printed on the usual customer's tape), and the cashier accounting totalizers, are not situated between these walls.

Access to the printing and totalizing mechanism for the customer's tape is obtained by opening door 36, and for the cashier accounting equipment by opening the door 38.

In other words, access to the equipment for ascertaining and printing classified totals, and the paper strip 201 associated therewith is obtainable only by opening the door 37, and such mechanism cannot be in anywise directly or indirectly reached or interfered with through access provided by opening of the doors 36 or 38.

A transverse plate 171 (shown in FIGS. 9, 17 and 19) extends from one to the other of the partitions 170, 170; for a purpose which will be hereinafter more fully explained.

Parts are provided for guiding cards when they are inserted through the slot 51, and for assuring that such cards shall be placed for and retained in suitable positioning during printing thereon of expressions of attained conditionings of totalizers which are responsive to scanning mechanisms and/or keyboards such as shown in FIGS. 1 and 2.

Forms and arrangements of such parts which embody certain of the more detailed features of this invention are shown in FIGS. 9, 10 and 12.

An unused card 215 suited for utilization with such parts is shown in FIG. 11. The corners 207, 208 of the rear or leading edge of this card are cut-away for diverse distances; the corner 207 being cut-away from the leading edge farther than the corner 208. This serves, in a manner which will presently be more fully explained, to assure that, when used with parts such as are shown in FIGS. 9, 10 and 12, printing will be accomplished only upon the intended side of the card and in desired positionings thereon.

It should be understood that the corners 208 of unused cards need not be cut-away, as just described, provided that there are suitable revisions in the positionings of the cut-away corners 207 of such cards, and further provided that the relative positionings of parts such as the blocks 209 and 209' which are shown in FIGS. 9, 10 and 12 are changed so that first printing will be then accomplished in corresponding relationship to the newly positioned initial cut-away corners 207.

It should also be understood that relative positionings could be reversed, so that the left hand corner 208 would be cut-away from the leading (rear) edge of the card of FIG. 11 farther than the right hand corner 207; in which event, the block 209 (FIG. 10) and the openings 214, 216 (FIG. 12) associated therewith would be situated correspondingly nearer the front edge of the table 202, than the block 209' and the openings 214', 216'.

A table 202 (FIGS. 9, 10 and 12) and presser fingers 203 (FIGS. 9, 10 and 17) extend rearwardly from the transverse plate 171.

The upper surface of said table 202 is positioned substantially in horizontal alignment with the top edge of the lower wall of the slot 51, and the rear edge of said table is adjacent, and a clearance distance forwardly from the impression position of printing equipment such as the type bars 204, which will be hereinafter described in greater detail.

Said fingers 203 are formed and positioned so as to assure that the leading or rear edges of intended cards, after being introduced through the slot 51, will pass above the platen 205 and, with a suitable clearance, below the printing ribbon 206 when this ribbon is in its elevated position as shown in FIGS. 9 and 20; and, hence, also below the type bars 204.

Guides 231, 231 extend along the table 202 at one side and the other of the path of such cards thereon. The lower portions of adjacent edges of said guides are spaced apart to permit intended cards to freely pass therebetween, and the upper portions of said guides provide edges 232, 232 which extend over the path of such cards.

Blocks 209, 209' (FIG. 10) are situated above the rear portion of said table 202; and parts carried by these blocks include card anchoring punches 212, 212' and detents involving card-responsive stops 210, 210', block guiding cheeks 222, 222', and corner cutting blades 221, 221', which serve for establishing progressive card-printing placements.

Figure 14:
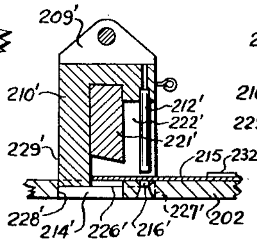
Figure 16:
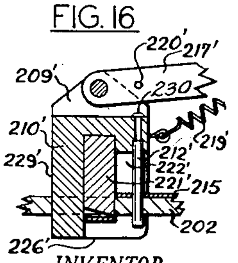

Openings are provided in the table 202 for receiving said parts while said blocks are in rearward positionings such as shown in FIGS. 14, 15 and 16; the openings 214, 214' (FIG. 12) being substantially L-shaped for receiving said stops, cheeks and blades, while the openings 216, 216' are round, for receiving said punches.

Said openings 214 and 216 are displaced rearwardly, with relation to the openings 214', 216', to an extent corresponding to the displacement of the corner 207 with relation to corner 208 of the card 215 shown in FIG. 11.

The upper portions of said openings 216, 216' should be snug, die fits for the lower ends of the punches 212, 212'; however, the lower portions of these openings may be somewhat relieved, flaring outwardly, so as to provide clearance for disks punched out of the cards.

Said punches may be retained in their blocks by use of a drive-fit, or otherwise; or else reduced diameter portions such as 230 (see FIGS. 13–16) may extend to the upper surface of the forward portions of the associated blocks, so that the upper-ends of these portions may be riveted over to hold the punches against withdrawal; and so that, after removal of such riveted portions if any, such reduced diameter portions may be utilized in driving the punches out, in the event of need for replacement.

For providing pivotal support for the blocks 209, 209' to permit swinging of the lower portions thereof forwardly and rearwardly, pins 218, 218' are carried by the rear ends of arms, such as the arm 217' which is shown in FIG. 9 in its relationship to a right hand portion (here shown in cross section) of the table 202.

The forward ends of said arms 217, 217' are supported by the pivot pins 173, 173' to permit swinging in a vertical plane; said pins being carried by ears (such as the ear 172' shown in FIG. 9), which ears are attached to the plate 171.

The springs 219, 219' urge forwardly the lower portions of said blocks, subject to the limiting action of the stop pins 220, 220'.

Said stops 210, 210' are of form and positioning in their blocks such that portions thereof are in the paths of respective corners 207, 208 of intended cards (such as that shown in FIG. 11) when such cards are passing along the top of the table 202 between the guides 231, 231; to the end that lower portions of said blocks may thereby be swung rearwardly, against the urge of their springs 219, 219', until at least one of said stops encounters the rear wall 228 or 228' associated therewith. The cheeks 222, 222' being then positioned (as indicated in FIG. 14) for entry into the opening portions 223, 223' provided therefor.

Lower portions of said stops extend into rearward portions of their associated openings 214, 214', and side walls of said stops snugly engage adjacent walls of said openings; thereby serving to prevent sidewise displacement of said blocks such as might carry said blades out of alignment with the openings which they should enter during cutting action.

The formation and situations of parts are such that when the lower portions of said blocks have been swung forwardly as far as permitted by their stop pins 220, 220', the forward portions of the lower edges 226, 226' of said cheeks 222, 222' will be in close proximity to portions of the upper surface of the table 202 immediately forward of the front walls 227, 227' of the openings 214, 214', to thereby prevent downward movement of said blocks; and the rear walls 229, 229' of said stops 210, 210' will be positioned with reference to the rear walls 228, 228' of said openings so that they may serve to arrest rearward swing of said blocks only when sufficient to permit said cheeks to enter portions of said openings provided therefor.

The length of said punches 212, 212' is such that when the lower portions of said blocks have been swung rearwardly (as by an inserted card) until the cheeks 222, 222' are positioned for entry into the opening portions 223, 223' (FIG. 14), the lower ends of said punches will be brought into close proximity to the upper surface of such card as may then be resting upon the table 202 over the openings 216, 216'.

Incident to ensuing downward block movement, the rounded lower front corners of said cheeks will engage the walls 227, 227' of said openings 214, 214', and thereby serve to cause the rear walls 229, 229' of said stops to be pressed firmly against the rear walls 228, 228' of said openings. The punches 212, 212' will thus be brought into alignment with their openings 216, 216', and the blades 221, 221' will be positioned for properly entering the portions of the openings 214, 214' provided therefor.

As said blocks thereafter continue downward movement, said punches will penetrate such card and thereby effect its anchoring in the intended printing position.

The formation of said blades is further such that, upon occurrence of penetration as just described, the lower portions of said blades will be brought to or near the upper surface of such card, so that the parts will be positioned as indicated in FIG. 15. Thereafter, still further downward movement of said blocks will cause said blades to suitably cut back the corners of such card, when said blocks have arrived at positionings such as shown in FIG. 16.

As will be seen in FIG. 10, the spacing between adjacent faces of the stops 210, 210' is substantially greater than that between like faces of the blades 221, 221'. Such greater spacing is for the purpose of assuring that when the corners of a card have been cut-away by said blades, such card cannot thereafter be inserted between the guides 231, 231 in any positioning other than such that cut-away card portions will simultaneously reach the front surfaces of said stops 210, 210'.

For effecting downward and upward actuation of the blocks 209, 209', toggle structures are provided together with actuating parts therefor, which will be most readily understood by reference to FIG. 9, in which links 241', 242' are shown, with their adjacent ends connected by the pivot pin 243; the upper end of said link 241' being hinged at 244' to a fixed support. The lower end of said link 242' is journaled on the pin 218', which pin also carries the block 209'. As shown in FIG. 10, corresponding parts 241, 242, 243, 244 are similarly associated with the block 209.

A cross bar 245 (FIGS. 9 and 10) carries the pivot pins 243, 243' at respective ends thereof; and the connecting bar 246 (FIG. 9) extends rearwardly from said cross bar.

A clevis 247 is provided at the rear end of said bar 246, which clevis is pivotally connected to the lower portion of a downwardly extending arm 249, which arm moves with the handle 63.

From the foregoing it will be apparent that the handle 63 is locked against swinging away from its usual rearward position (that is, from left to right as viewed in FIG. 9) unless both the blocks 209 and 209' have been swung rearwardly to an extent such that the cheeks 222, 222' are positioned (as indicated in FIG. 14) for entry into the opening portions 223, 223'. Hence, if a card is inserted through the slot 51 with unintended side upward, and thereafter moved rearwardly, the transverse wall of the notch at the corner 208 of such card will encounter the stop 210 (instead of the stop 210'), and rearward movement of such card will thereupon be terminated without having brought the corresponding wall of the notch at the corner 207 against the stop 210'. Consequently the block 209' will not be swung rearwardly, and the handle 63 cannot then be swung forwardly.

However, when such a card has been so inserted with the intended side upward, ensuing rearward movement of such card will cause the transverse walls of the notches at the corners 207, 208 to reach the front surfaces of the stops 210, 210', respectively, at substantially the same time, and thereby effect rearward swing of both of the blocks 209 and 209' such as will bring the cheeks 222, 222' in substantial alignment with the openings 223, 223' provided therefor in the table 202. The handle 63 may thereupon be swung forwardly (to the right as viewed in FIG. 9), thereby to cause the arm 249 to act through the connecting bar 246 and the cross bar 245 to effect straightening the links 241, 242 and 241', 242' of the toggles.

Such straightening of said toggles will cause the punches 212, 212' to penetrate and thereby anchor the card in printing position and, as the toggles continue to approach straightened positioning, the blades 221, 221' will be caused to further cut back the corners of the card then in printing position; the blocks 209, 209' then attaining positionings such as shown in FIG. 16.

It should be observed that the cutting away of the corners of the card occurs when the toggles are approaching straightened positioning, and are therefore working at the greatest advantage. This results in best distributing the load which must be overcome by the operator incident to the forward movement of said handle 63.

Results of first and second printings of totalizer sums are shown at an enlarged scale in FIG. 21. The sums here shown in line 261 represent conditionings of the various totalizers when the card was first inserted, and the sums in line 262 express such conditionings when the card was later again inserted. Legends shown in line 263 may be preprinted upon the card to indicate the various accounting classifications.

It should be noted that FIG. 21 shows a card such as that of FIG. 11, turned around, end for end, so that the figures here appear right side up, and the latest total 262 is seen above the original total 261, thereby to facilitate subtraction for ascertaining the net change between one and the other of the printings.

Instead of legends such as shown in line 263 being preprinted upon the cards to indicate the various accounting classifications, mechanism for printing the various totalizer sums may also provide for printing prefix or suffix symbols or letters such as the symbol # for identifying the serial number of the latest sale or transaction, the letter G for groceries, the letter M for meats, the letter P for produce and the symbol * for the sum of the other totals.

Other suitable methods of identifying such totals will readily suggest themselves to persons skilled in this art.

If desired, mechanism may be provided, supplemental to that shown in the drawings and hereinbefore described, whereby dates and hours of day will be printed on customers' sales tapes, and correspondingly printed upon the continuous paper strip 201 and cards inserted through the slot 51. Such date and hour printing could well take the place of the printing of the transaction number.

Inasmuch as time stamp facilities for so printing dates and hours are likely to require manual resettings from time to time, the provision of facilities for making such resettings tends to impair reliability; so that printing of transaction numbers by mechanism not subject to resetting by users, is likely to be found most expedient.

It may be deemed desirable to have persons producing these records add penwritten signatures or initials, together with dates and hours. If this is done, printing of transaction numbers and/or dates and hours may be deemed unnecessary.

Such penwritten markings may be placed below the lower record (the one first taken) and above the upper record (the one last taken); or space may be provided for such datings and signatures at one end or the other of each line of figures.

It will also be noted that the cut-away corner portions 207', 208' of FIG. 21 extend much farther from the leading edge of the card than the portions 207, 208 of FIG. 11; this having resulted from the cutting back of these corners incident to the first and second printings.

Incidentally, it will be noted that in the use of cards such as those of FIGS. 11 and 21, a major portion of the card area is merely provided for the purpose of enabling the user to grasp the forward edges of such cards when placing them in printing positionings. Aside from this, there would be no occasion for having such cards extend forwardly, say beyond the dotted line 264 (as viewed in FIG. 11) or above the printed line 263 as viewed in FIG. 21, if provision is made for suitably placing these cards for printing without having them project outside of the slot 51. It will therefore be apparent to those skilled in this art that such extensive unused area could be eliminated if holders are provided for placing the cards for printing, such, for example, as the holders commonly used in banks and elsewhere for holding passbooks and statements during entries thereon by bookkeeping machines. Inasmuch as such frames or holders form no part of this invention, they are not shown by the drawings and will not be further described herein.

Certain of the broader features of this invention may be utilized with printing mechanism having type bars or wheels more or less along the lines of prior mechanisms which are well-known to persons skilled in this art. However, for best results, printing mechanism should be utilized comprising type bars such as the bars 204, of which five groups are shown in FIG. 10. Each of the groups here shown comprises eight type bars, but it should be understood that the numbers of type bars in such groups may be varied, as circumstances may render desirable.

One of such groups may express the serial number of the last sale or transaction, another group the sum of all of the items of all transactions, and the other three groups may represent sums in accordance with accounting classifications such as Groceries, Meats, Produce.

Structure for effecting printing action of the type bars 204 shown in FIG. 10 will be most readily understood by reference to FIG. 17, which shows mechanism for operating an illustrative one of such type bars responsive to movements of the handle 62; and it should be understood that similar parts are provided for rendering such type bars correspondingly operably responsive to like movements of the handle 63.

Each of said type bars is pivotally connected, as at 301, with an arm such as 302, and extends forwardly therefrom. Each of said arms is independently movable to various positionings expressive of conditionings of respectively associated totalizing mechanisms.

Such arms 302 may be carried by or subject to actuation by so-called "slides" or functionally equivalent parts of one or another suitable well-known totalizing mechanisms. Inasmuch as various suitable forms of totalizing mechanisms are well-known to persons skilled in this art, such mechanisms are not shown in the accompanying drawings and will not be hereinafter further described.

Springs, such as 303 may be applied for resiliently urging upward movements of said type bars, so as to suitably space them from the platen 205; or, instead of using such springs, said type bars may be maintained in usual elevated positionings by actuating mechanism which will be presently described in greater detail.

A series of type faces 304 are distributed along the lower surface of each type bar, in positionings such that when any bar is brought into printing relationship with the paper strip 201 or with a card which is resting upon the upper surface of the platen 205, one or another of such faces will be brought into printing relationship with such paper or card, depending upon the then positioning of the arm 302.

In association with each of the type bars 204, there is a hammer bar 305 which is journaled on the shaft 306 and carries a hammer stud 307. The lower ends of said studs rest against the upper surfaces of the type bars respectively associated therewith in relationship such that when any type bar has been swung downwardly to printing position, the lower end of its associated stud will be applied to the upper surface of such bar directly over the one of the type faces 304 which is then in printing position.

Springs 308 urge the various hammer bars toward their associated type bars.

A resilient stop bar 309 may be situated in the paths of the downward movements of the various hammer bars 305 for imparting a slight upward rebound immediately after printing action.

Instead of using the springs 303 for swinging the type bars away from the platen, each of the hammer studs 307 may carry a strip 310, passing at one side or the other of the associated type bar, the lower end 311 of each of which strips is bent so as to project into a slot 312 which may be provided in the associated type bar 204. Best results will be obtained by omission of such slots when not needed.

Arms 313, 313′ are hinged on the lugs 314, 314′ carried by the transverse plate 171; and rollers 316, 316′ are carried by said arms intermediate the ends thereof. These rollers ride the peripheries of 5-lobe cams 317, 317′ which are fixed upon the shaft 320, near respective ends thereof.

Concave dwell depressions 318 . . . 318 are formed in the highest portions of each of the lobes of said cams, for receiving the rollers 316, 316′; thereby to serve for stabilizing the positionings of these cams when they are at rest. These depressions are so formed that, at the commencement of each cycle of actuation of said cams, said arms 313, 313′ will be slightly raised before lobes which had been supporting said arms are withdrawn from the paths of the associated rollers 316, 316′.

A ratchet wheel 319 is fixed upon said shaft 320; and actuating arms 321, 321′ are journaled on said shaft at respective sides of said ratchet wheel.

The pawls 322, 322′ are pivotally attached to adjacent sides of said arms for engaging the teeth of said ratchet; and the springs 323, 323′ urge said pawls toward said ratchet.

Links 324, 324′ connect the free ends of said arms 321, 321′ with pivot pins 326, 326′ which are carried by structures which move with the handles 62 and 63, respectively.

The form and proportioning of these parts is such that when said handle 62 is moved from its forward to its rearward position, such movement will be transmitted through said link 324, the arm 321 and the pawl 322 to impart slightly more than one-fifth of a revolution to the ratchet wheel 319; thereby to cause previously supporting lobes of the cams 317, 317′ to be withdrawn from the path of the rollers 316, 316′; with results which will presently be more fully described.

The form and proportioning of said parts is further such that when the handle 63 is moved from its forward toward its rearward positioning, said cams will be correspondingly actuated.

Depending links 325, 325′ are pivotally connected at 329, 329′ to the free ends of the arms 313, 313′, respectively.

A bail bar 327 is connected to the lower ends of said links. Said bail bar extends beneath the free or forward ends of all of the hammer bars 305; and the upper edge of said bail bar is of inverted V form so as to fit into V-shaped notches, such as 328, which are provided in the lower surfaces of said hammer bars.

From the foregoing it will be evident that during early portions of rearward movements of either the handle 62 or the handle 63 from extreme forward positionings, such lobes of the cams 317, 317′ as had been supporting the rollers 316, 316′ will be withdrawn from the paths thereof, so that the arms 313, 313′ will be permitted to move downwardly responsive to the urge imparted thereto by the springs 308, acting through the bars 305, the bail bar 327 and the links 325, 325′, with resultant printing action by the type bars, such as hereinbefore more fully described; and further ensuing movements of said handles will thereafter cause said cams to act, through said rollers, arms, links and the bail bar 327 to lift all of the hammer bars 305, with resultant cocked positionings of all of the type bars 204.

While the mechanism for printing on the paper strip 201 and upon inserted cards hereinbefore just described and which is shown in detail in the accompanying drawings is believed to be particularly suited for use in the practice of this invention, it should be understood that there are several well-known types of printing mechanisms which are more or less suitable for use in machines embodying other features of this invention. Hence, utilization of other features of this invention is not limited to use of the type of printing mechanism hereinbefore described and shown in the accompanying drawings.

Mechanism is provided for effecting the actuation of the shutter 71. Said mechanism comprises the arms 351, 351′ which are fixed on the shaft 102′ adjacent respective ends thereof; the structure moving with the handle 62 being also fixed upon said shaft, as by the set screw 352′ (FIGS. 10 and 17).

Pins 353, 353′ are respectively carried by said arms, near the lower ends thereof, and project into slots formed in the arms 354, 354′, such as the slot 355′ shown in FIG. 17.

Said arms 354, 354′ are pivotally supported on the studs 356, 356', and extend forwardly therefrom, having pins 357, 357' near the forward ends thereof.

The shutter 71 has, near respective ends thereof, ears 358, 358' extending from the upper edge thereof, in which ears said pins 357, 357' are journaled.

The lower edge 359 of said shutter is ordinarily snugly contained in a slot 360, of which slot the transverse plate 171 forms the forward wall, and a forward portion of the table 202 and the forward ends of the overhanging edges 232 of the guides 231 provide the rear walls.

The formation and relationship of the parts of the mechanism just described is such that when the handle 62 is in its forward position (the pins 353, 353' being then near the rearward ends of said slots, 355, 355') the shutter 71 will be firmly held in its lowered position; and said formation and relationship is further such that, as said handle approaches the end of its rearward movement, said shutter will be raised sufficiently to permit cards to be inserted through the slot 51, but not sufficiently to carry the lower edge 359 of said shutter above the guides 231.

The shutters 71' and 71'' are correspondingly governed by the handle 64, so that when said handle has been fully swung to the left the shutter 71' will be raised, and when said handle has been fully swung to the right the shutter 71'' will be raised; so that both of said shutters will be held in closed positionings when said handle is otherwise positioned.

The platen 205 is fixed upon the shaft 375, which shaft is suitably supported, as by the posts 376, 376' (FIGS. 10 and 19).

Mechanism for effecting rotation of said platen is shown in the left hand portion of FIG. 10, and will be most readily understood by reference to FIG. 19. The mechanism here shown includes a ratchet wheel 377 secured in fixed relation to said platen; together with an actuating pawl 378 engaging the teeth of said wheel.

The spacing of the teeth of said ratchet wheel is such that, when printing has been effected on the continuous paper strip 201 as hereinbefore explained, an extent of rotation of said platen will be effected such that the paper 201 will be caused to carry the printed record forwardly, past the adjacent rear end portion of the table 202, in order that, if a record card is thereafter introduced through the slot 51, and a record is printed thereon, the previously printed record on the paper 201 will not be impaired by either the introduction or withdrawing of such card, or by the printing of a record thereon, even if the ink of the previous printing on the paper 201 has not yet dried.

An arm 379 is journaled on the shaft 375 and has the pawl 378 hinged thereto; and the spring 380 being provided for urging the free end of said pawl toward the teeth of the ratchet wheel 377.

A downwardly extending arm 351 is fixed upon the shaft 102', as by the set screw 352, and a pin 353 is carried by said arm near the lower end thereof.

A link 384 has a slot 385 in the upper portion thereof for receiving said pin 353, and the lower end of said link is hinged to the rear end of the arm 379, as by the pin 386.

The parts just described are proportioned and arranged so that, incident to movement of the handle 62 from its forward to its rearward position, the pawl 378 will effect rotation of the ratchet wheel 377 to an extent at least as great as (and preferably somewhat greater than) the angular distance between teeth of said ratchet wheel; and so that, incident to movement of said handle from its rearward to its forward positioning, said pawl will be repositioned for engaging another tooth of said ratchet wheel, as indicated in FIG. 19.

A dog 387 is pivoted at 388 to a lug 389 carried by the under surface of the table 202, which dog serves to retain the ratchet wheel 377 against reverse movement during restoration of the handle 62 from its rearward to its forward position. A spring 390 urges swing of said dog into the path of said ratchet teeth.

If desired, ratchet wheels such as 377 and parts associated therewith may be duplicated adjacent respective ends of said platen 205.

Further referring now to FIGS. 10 and 19, supply of the paper strip 201 to the platen 205, and storage of such paper after imprinting of records thereon, is accomplished by use of a supply roll 391, which is carried by a shaft 392 journaled in the supports 393, 393'. The take-up roll 394 is fixed upon the shaft 395 which is journaled in the supports 396, 396'. The supply roll 391 is preferably situated below the take-up roll 394; and both of said rolls are mounted below the table 202.

Means for resiliently urging suitable rotation of the take-up roll 394 is diagrammatically indicated in FIG. 10 at 398. However, inasmuch as details of various forms of take-up driving means are well-known to persons skilled in this art, and form no part of this invention, such details are not shown by the drawings and will not be further described herein.

A suitable brake member is diagrammatically represented by the friction drag arm 397 shown in FIG. 19.

A guide roller 399 for pressing the paper 201 toward the platen 205 is mounted on the shaft 400, and it should be understood that usual structure (not shown) is provided for the purpose of urging said roller toward said platen in order to assure adequate traction for said paper strip.

In the interest of clearness, details of the structure for governing positionings of the ink ribbon 206 are mostly omitted from FIGS. 10 and 17; but such details are more fully shown in FIG. 20.

Suitable ribbon reversing mechanism should be supplied. Certain detailed characteristics of such reversing mechanism are not shown in the drawings, and will not be herein described in detail, as such omitted details form no part of this invention, and persons skilled in this art are acquainted with various well-known types of ribbon responsive means for governing direction reversing mechanisms which are suitable for use with this invention.

Whatever method is employed for guiding the ink ribbon, it is important that, other than during printing, this ribbon shall be held reasonably taut and at such an elevation above the table 202 that said ribbon will be out of the path of the advancing edge of any record card which may be inserted along the upper surface of said table, under the overhanging edges 232, 232 of the guides, 231, 231 beneath the presser fingers 203 (best shown in FIG. 9).

To this end, there are a series of supports 211 . . . 211 individually disposed at respective sides of each of the groups of the type bars 204. Said supports 211 are carried by a series of arms 410, 410', 410'' . . . 410'', which arms are journaled on the shaft 306 (see also FIG. 17) and are associated with the bail bar 327 in a manner corresponding to that of the hammer bars 305; springs such as 308 being applied to the rear ends of said arms for urging downward movement of the forward ends thereof.

As shown in FIG. 20, the arm 410 is situated to the left of the left hand group of hammer bars, and a similar arm 410' is situated to the right of the right hand group of hammer bars; other arms 410'' . . . 410'' are situated between the various groups of hammer bars.

The ribbon spools 412, 412' are provided for paying out and rewinding of the ink ribbon 206, and brackets 411, 411' are secured to the lower surface of the table 202; said ribbon spools being journaled on shafts 413, 413' carried by said brackets.

Coil springs 414, 414' are applied for urging rotation of the respective spools in directions for winding the ribbon upon them.

A bar 415 extends leftwardly from the arm 410, and the upper end of a dog 416 is pivotally connected to the left hand end of said bar; the lower end of said dog being formed for engaging the teeth of a ratchet wheel 417 for causing rotation of the associated spool 412 in ribbon-winding direction during downward movement of the arm 410, and a spring 418 urges said dog toward such engagement.

Correspondingly, a bar 415' extends to the right from the arm 410', and the dog 416' is pivotally connected to the right hand end of said bar for cooperation with the ratchet wheel 417'.

Retaining pawls 419, 419' extend downwardly from their associated pivotal supports 420, 420', for at times preventing ribbon-unwinding rotation of the ratchet wheels 417, 417', respectively.

Upwardly extending portions of said retaining pawls 419, 419' are interconnected by a link 421, whereby positioning of either pawl for engagement with its wheel causes the other pawl to swing away from its wheel.

Lugs 422, 422' extend to the right and to the left from the respective pawls 419, 419'; and the pins 423, 423' carried by said lugs are situated in the paths of the dogs 416, 416', so that when either of the pawls 419, 419' is swung clear of engaging relationship with its associated ratchet wheel, the associated dog 416 or 416' will also be moved away from engaging relationship with the teeth of its associated ratchet wheel. However, the relationships between the dogs 416, 416' and their associated pins 423, 423' are such that the teeth of the wheels 417, 417', in passing said pawls, will not cause said pins to swing said dogs away from their associated ratchet wheels.

Abrupt reversals of directions of ribbon feed resultant from substantially complete depletion of the ribbon supply on one and the other of the spools 412, 412' is assured by mechanism comprising parts as follows:

An arm 424 is pivotally supported at 425. The upper end of said arm is forked, and carries the lugs 428, 428' which are situated at respective sides of the pin 427 carried by the aforesaid link 421. The association of these parts is such that a lost-motion driving relationship is established between the upper end of said arm and said link.

A spring 436 is applied between a fixed support 430 for its lower end and a pin 431 carried by said arm 424 in relationship to its pivot 425 such as to provide an over-center snap-action connection.

A cross bar 435 passes beside the lower end of said arm 424, and is longitudinally movable by suitable parts (not shown), which parts are associated with the ink ribbon in some well-known manner such that, when nearly all of the ribbon has been withdrawn from the spool 412, said bar 435 will be moved to the right; and, correspondingly, when nearly all of the ribbon has been withdrawn from the spool 412', said bar will be moved to the left.

A pin 434 is carried by said bar 435 in positioning such that it projects into a slot 432, which is formed in the lower portion of said arm 424.

The parts just described are proportioned and relatively arranged so that, movement to the left of said bar 435 from the positioning of parts shown in FIG. 20, will cause the upper end of the arm 424 to be moved to the right far enough to result in the aforesaid snap-action before the lug 428 is brought against the pin 427; to the end that, incident to such snap-action, said lug will act through said pin to move said link 421 from left to right, and thereby swing the retaining pawl 419 and the actuating dog 416 out of the path of the teeth of the ratchet wheel 417, while permitting the retaining pawl 419' and the dog 416' to swing into the path of the teeth of the ratchet wheel 417'.

Thereafter, when the bar 435 is moved to the right to the positioning shown in FIG. 20, the lug 428' will not be brought against the pin 427 until the upper end of the spring 436 has been carried far enough to the left over the pivot 425 so that the ensuing snap-action will restore the pawls 419, 419' and the dogs 416, 416' to the positionings shown in FIG. 20.

Ribbon guiding rollers such as 437, 437' are associated with the brackets 411, 411' for guiding the ribbon 206 as it passes to and from the spools 412, 412', to the end that the ribbon will be suitably positioned irrespective of the amount thereof at any time on one spool or the other.

Incidentally, it is desirable that the ribbon shall be moved downwardly, substantially to the surface of such card as is to be printed upon, either just before or at the instant when the hammer bars are released, and that there shall be a degree of ribbon tension relaxation incident to such downward movement, to the end that the printing force exerted by the hammers will not be absorbed to any very serious extent by obstructive action of the ribbon.

As already indicated, the ribbon should be lifted clear of the card path immediately after the printing action, so that when a card has been withdrawn and another one substituted, there will be no danger that the rear edge of the inserted card will catch on and displace the ribbon.

It will be observed that the presser fingers 203 (FIG. 17) extend rearwardly sufficiently far to keep the advancing edges of inserted cards well below the elevated position of the ribbon.

The formation and relative positioning of parts is such that release of the printing hammers will occur during the early portions of the rearward movements of the handle 62, and so that rotation will not be imparted to the platen roller 205 (FIG. 19) until the hammers (and hence the type bars) have been lifted an appreciable distance above printing contact with the paper strip.

Should the arrangement of parts be such that, even resultant from rapid rearward movement of the handle 62, rotation of the platen might commence while the type bars were in printing position, there would be opportunity for impairment of the printed record.

As hereinbefore stated, mechanism is provided for scanning and otherwise processing tablets or tokens which are individually placed or stacked in the magazine SM61, responsive to actuations of parts such as the starting bar SM81, the stop key SM83, the sub-total key SM85, and the final total key SM87. Detailed features of such mechanism are not shown by the accompanying drawings nor herein described, as mechanism suitable for these purposes is fully shown and described in the aforesaid Stratton et al. patents. The same is true of mechanism responsive to the conditioning handle SM701, and details of the keyboard mechanism 81 shown in FIG. 2.

Similarly, there are various well-known types of mechanisms which are suitable for utilization with this invention for printing items on customers' tapes; which tapes may emerge through slots 42 in accordance with well-known practices such as exemplified, for example, in Patent No. 2,226,919, dated December 31, 1940, to Gubelman for Cash Register.

Reference is hereby made to the aforesaid Stratton et al., and Gubelman patents, for examples of details of drawer mechanisms and releasing devices therefor, construction and control of indicating devices and other adjuncts suitable for use in embodiments of this invention such as are contemplated by FIGS. 1 and 2.

Equipment for printing attained aggregates expressed by totalizing mechanisms for one cashier and the other should, preferably, be arranged in a manner analogous to that hereinbefore described with reference to printing upon cards inserted through the slot 51. That is, the shutters 71', 71'' are controlled by the handle 64 in a manner analogous to the control of the shutter 71 by the handle 62, to the end that both of said shutters 71, 71'' will be in closed positionings when the handle 64 is in its intermediate or upright positioning. The shutter 71' will be withdrawn when the handle 64 is moved to its left hand position, and will be returned to its closed position when said handle is thereafter returned to its upright position. The shutter 71" will be withdrawn when said handle is moved to its right hand position and will again close the slot 53 when said handle is returned to its vertical position.

The control of the printing mechanism for cards inserted through slots 52 or 53 is also analogous to that of the printing mechanism for cards inserted through the slot 51, hereinbefore more fully described; so that, when a card has been inserted in one of said slots 52 or 53, and the handle 65 is thereafter moved from its rear to its forward positioning, such card will be anchored, and its corners cut off. When said handle 65 is thereafter returned to its usual rearward position, the then attained aggregate charge expressed by the totalizing mechanism representative of the cashier, indicated by the then positioning of the handle 64, will be printed upon that card, and the anchoring punches withdrawn.

It should be noted that the walls 170, 170 (FIG. 10) and the locked door 37 securely enclose the accounting classification and aggregate sales totalizing mechanisms; to the end that these mechanisms are very effectively guarded against unauthorized manipulation. The same is true of the cashier totalizing mechanisms which are enclosed between one of the walls 170 and the right hand end wall of the cabinet, behind the locked door 38.

*Operation*

Printing of records of the totals expressed by the totalizer mechanisms representative of various accounting classifications is desirable under many circumstances; as at the commencement and again at the ending of the business for a day, week or other elapse of time, or when a mechanism embodying this invention has just been placed in or is about to be taken out of commission.

Upon each occasion when cards are inserted and printed upon for recording attained aggregate sums at the conclusion of an observed period, other cards should likewise be printed upon to represent the start of another daily, weekly or monthly observed period, or the next visit of an auditor, as the cases may be.

As an added precaution, confirmatory printing can be made of the then existing aggregates of the various totalizers, at the commencement of the next observed period, in order to prove that there had been no sums entered in the totalizers since the printing of the aggregates at the conclusion of the previous observed period. If such confirmatory printing is done; for example, in the instance of the daily cards, there would ultimately be three items printed upon the card, for each classification, the lower one of which items would show the totalizer aggregates at the end of the preceding day, the items directly above would show such aggregates at the commencement of the current day, and the final or upper item would show the aggregates at the end of the current day. If such a course is followed, it is evident that the two lower items of each classification should be identical, and that only the upper one of these items should be subtracted from the aggregates printed directly above them at the end of the day.

Assuming now, for example, the use of a mechanism such as that shown by FIG. 1, and that the various manually operable parts are positioned as there indicated, and further assuming that there are no tablets or tokens in the magazine SM61, printing of such aggregate sums upon suitable cards may be accomplished by procedure as follows:

A suitable key should be inserted and turned in the lock 74; whereupon the handle 61 should be moved from left to right. Inasmuch as the various parts of the structure associated with said handle 61 will, at the commencement of such movement, be positioned as shown in FIG. 3, the magnet 161 (FIG. 7) will be deenergized (the contacts 162 then being open, because of absence of tablets in the magazine SM61) and the spring 123 (FIG. 3) will have swung the latch 118 so that the upper end thereof will be in the path of the lug 119, thereby to prevent movement of the arm 116 responsive to its spring 120 such as would carry the tooth 115 into the path of the teeth of the segment 106 when the projection 117 is withdrawn from support of said tooth 115.

Immediately after commencement of left to right movement of said handle, the contacts 160 will open, thereby interrupting connection between the current supply and the operation governing parts of the scanning mechanism associated with the magazine SM61 (FIG. 7); whereby to render such mechanism inoperable until said handle has been returned to its usual left hand positioning.

Inasmuch as the pin 122 will have previously moved the latch 112 from the path of the pin 114, (again referring to FIG. 3) the spring 110 will therefore have caused the arm 108 to carry the tooth 107 into the path of the teeth of the segment 105, to the end that, after the first of the teeth of said segment has passed to the right of said tooth 107, said handle cannot be returned to its initial or left hand positioning until it has been moved rightwardly far enough to bring the projection 111 into the path of said tooth 107.

Just prior to the conclusion of such rightward movement of said handle, the maximum diameter portion of the track 138 will be withdrawn from the path of the arm 137, whereupon said arm and the arm 139 (see also FIGS. 4 and 5) will be permitted to move responsive to the spring 134' to positioning such as will permit the latch 112' to swing into the path of the pin 114', thereby to permit rearward movement of the handle 62 by retaining the arm 108' in positioning such that its tooth 107' will be out of the path of the teeth of the segment 105'.

In order ot print the attained sums of the various totalizers on the paper strip 201 (FIG. 17), the handle 62 may now be moved rearwardly.

The latch 112' having been moved by its spring 135', the arm 108' will not be permitted to move in response to its spring 110', so as to carry the tooth 107' into the path of the teeth of the segment 105' during rearward movement of said handle.

At the commencement of such movement, the pin 121' will be holding the latch 118' out of the path of the lug 119', so that the arm 116' will have been moved by its spring 120' to carry its tooth 115' into the path of the teeth of the segment 106'; to the end that, after the first of said segment teeth has passed rearwardly of said tooth 115', said handle 62 cannot be returned to its forward positioning until it has been moved rearwardly so that the projection 117' will act upon said tooth 115' to swing said arm 116' to a position such that its lug 119' will be below the projection at the upper end of the latch 118', whereupon said latch 118' will be moved by its spring 123' (being no longer held against the urge of said spring by the pin 121'), to retain the arm 116' in its lowered position; thereby to permit forward movement of said handle 62.

Near the conclusion of rearward movement of said handle, the pin 122' engages the latch 112' and swings it against the urge of its spring 135' into disengaging relationship with the pin 114', thereby to permit the arm 108' to move in response to its spring 110' so as to carry its tooth 107' into the path of the teeth of the segment 105'.

At the commencement of the aforesaid rearward movement of said handle 62, the structure moving with said handle will act through the link 324 (FIG. 17), to swing the arm 321 upwardly, so that the pawl 322 will effect a step of rotation of the ratchet 319; thereby rotating the cams 317, 317' so as to withdraw the depressions 318 of the lobes of these cams which had been acting to support the arms 313, 313' in elevated positionings through the rollers 316, 316'.

Upon such withdrawal of cam lobes from said rollers, the hammer bars 305 and the arms 410, 410', 410'' . . . 410'' (FIGS. 10 and 20) will move downwardly responsive to their associated springs 308, thereby bringing the ribbon 206 into close proximity with the upper surface of the paper 201, and causing the various type bars 204 to be driven downwardly by the hammer studs 307, thereby to cause printing action by desired ones of the type faces 304 (as determined by positionings of the various totalizer arms 302), thus imprinting upon said paper the sums expressed by the conditionings of the various totalizers.

During the latter portion of the downward movement of the forward ends of the hammer bars 305, such ends will encounter the resilient stop bar 309, and flex said bar downwardly; whereupon the resiliency of said bar 309 will cause the hammer bars 305 (and hence the type bars 204) to be lifted slightly above printing position.

Continued rearward movement of the handle 62 will thereafter correspondingly cause further rotation of said cams 317, 317', to cause the next lobes thereof to act through the rollers 316, 316', to raise the arms 313, 313', and with them the bail bar 327, with resultant lifting of the hammer bars 305, and of the arms 410, 410', 410'' . . . 410'', with resultant raising of the type bars 204 and the ink ribbon 206 to their usual positions and clearing of the path of cards which may be thereafter inserted through the slot 51.

Incident to such continued rearward movement of the handle 62, the pin 353 at the lower end of the arm 351 (best shown in FIG. 19) will act through the link 384 to lift the arm 379, so that the pawl 378 will impart a step of rotation to the ratchet 377 and, hence, to the platen 205; thereby to carry the newly printed figures on the paper 201, forwardly past the rear edge of the table 202, so that the record thus produced cannot be impaired incident to subsequent insertion of cards through the slot 51.

Just before the conclusion of the aforesaid rearward movement of said handle 62, the pins 353, 353', moving in the slots 355, 355' will lift the arms 354, 354', so as to raise the shutter 71 above the slot 51.

As shown in FIGS. 3, 5 and 6, completion of such rearward movement of said handle 62 will have caused the arm 154 to so position the pin 153 as to permit the upper end of the latch 118'' to swing into the path of the lug 119'', thereby to prevent the arm 116'' from carrying the tooth 115'' into the path of the teeth of the segment 106''. The handle 63 may therefore be subsequently moved forwardly without hindrance from the coaction of said tooth 115'' with said segment 106''. Freedom for such forward movement is nevertheless still dependent upon rearward swinging of the blocks 209, 209' (FIG. 9), as by the leading edge of a suitable card.

If, now, a suitable card (such as the card 215, shown in FIGS. 11 and 21) is inserted in said slot 51, portions of the advancing edges of adjacent corners of such card will be brought against the front surfaces of the stops 210, 210', and thereby to swing said stops, and the blocks 209, 209' which carry them, so as to bring the rear walls 229, 229' of said stops against the rear walls 228, 228' of the openings 214, 214' in the table 202 (FIG. 12); thereby to bring the punches 212, 212' and the forward surfaces of the cheeks 222, 222' in alignment with the openings provided therefor in the table 202 (the parts then being positioned as indicated in FIG. 14).

While the parts are positioned as just described, the handle 63 should be moved forwardly; thereby causing the arm 249 to act through the bars 246 and 245 to straighten the toggles comprising the links 241, 241', 242, 242', thereby to move said blocks 209, 209' downwardly.

In the early portion of such downward movement of said blocks, the punches 212, 212' will penetrate such card as is then engaging the front surfaces of the stops 210, 210', attaining positionings indicated in FIG. 15, such that the inserted card will be anchored against displacement.

Still further forward movement of said handle 63 will cause the blades 221, 221', to cut off the corners of the card, as indicated in FIG. 16.

During such forward movement of said handle 63, said handle and the structure moving therewith, will be held against rearward movement by engagement of the tooth 107'' with the teeth of the segment 105'', until, at the conclusion of such forward movement, the projection 111'' is brought under said tooth.

Referring now to FIG. 18, it will be seen that the aforesaid forward movement of the handle 63 will cause the link 324' to downwardly swing the arm 321', and thereby carry the pawl 322' to a position such that during ensuing upward swing of said arm 321', a step of rotation will be imparted to the ratchet wheel 319 and to the cams 317, 317'.

During such downward movement of the arm 321', the ratchet wheel 319 and parts moving therewith will be held against clockwise rotation by the pawl 322 which, at this time, will be in its extreme counter-clockwise or upper position.

After completion of the forward movement of said handle 63, it should be moved rearwardly to its usual positioning. Incident to commencement of such rearward movement, the link 324' will act through the arm 321', the pawl 322', and the ratchet wheel 319 to impart a step of rotation to the cams 317, 317', with resultant printing of attained sums expressed by positionings of the type bars 204, as more fully explained with reference to commencement of rearward movement of the handle 62.

After occurrence of such printing action, further rearward movement of said handle 63 will cause the link 324' and the arm 321' to carry the pawl 322' upwardly, with resultant counter-clockwise rotation of the cams 317, 317', so that the hammer bars 305 and the type bars 204 will be again cocked, and the rollers 316, 316' will thereupon rest in depressions 318, of the next lobes of the cams 317, 317'.

Incident to aforesaid rearward movement of the handle 63, the toggle links 241, 241', 242, 242' (FIGS. 9 and 10) will be moved to their usual positionings, thereby withdrawing the anchoring punches 212, 212' from the card upon which the totals will then have been printed, thereby permitting withdrawal of this card.

Figure 13:
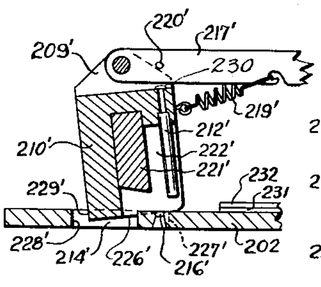

Inasmuch as corners of the card thus printed upon will have been cut away incident to downward movements of the blocks 209, 209', the cheeks 222, 222' carried by said blocks will now be moved forwardly by the springs 219, 219' to positionings indicated in FIGS. 9 and 13, so that forward portions of the under surfaces of these cheeks will be situated forwardly of the front walls 227, 227' of the openings 214, 214', and above the top surface of the table 202, so as to prevent downward movement of said blocks 209, 209', unless and until the same or another card 215 is thereafter moved rearwardly far enough so that, if another printing is then effected, such subsequent printing will be readably spaced above (forwardly of) the printing first effected.

Other cards (such as the card 215) may thereafter be inserted and correspondingly printed upon, so long as the handle 62 remains in its rearward position.

Other cards which have not been previously printed upon may then be inserted, one after another, for the purpose of printing thereon attained aggregates of the various totalizers at the commencement of the next period of observation.

Should a record card be inserted "wrong-side up" the positionings of the cut off corners of such card will not correspond with the positionings of the front surfaces of the stops 210, 210'. Hence, with the positioning of the blocks 209, 209' with reference to table 202 as indicated in FIG. 12, the corner 207 of such upside down card will swing the block 209' rearwardly, but the leading wall of the cut away corner 208 will not reach the stop 210 carried by the block 209, and the bottom edge 226 of the cheek 222 will therefore project over the wall 227 of the opening 214, and prevent downward movement of the block 209; thus preventing significant forward movement of the handle 63.

After all of the desired cards have been inserted, printed upon and withdrawn from the slot 51; the handle 63 then being in its rear positioning, the handle 62 may be swung forwardly to its usual position, thereby causing the pins 353, 353′ to be moved in the slots 355, 355′ in the arms 354, 354′ so as to cause the shutter 71 to close the slot 51.

It will be evident that if a card was extending through the slot 51 into the path of the shutter 71 when attempt was made to swing the handle 62 away from its rearward position, such card would block the downward movement of the shutter 71, and thereby prevent significant forward movement of the handle 62 until such card had been withdrawn.

When the handle 62 has been restored to its usual forward positioning, the raised portion of the track 133 will have been brought under the bent over end of the arm 132, and thereby act through said arm, and through the shaft 136, to swing the free end of arm 131 away from the latch 112, which latch will then be moved by its spring 135 so as to carry the laterally extending portion of its upper end into the path of the pin 114, thereby to prevent said arm 108 being swung by its spring 110 to carry the tooth 107 into the path of the teeth of the segment 105 when the projection 111 is thereafter withdrawn from the path of said tooth 107, incident to movement of the handle 61 from its right to its left hand position. From the foregoing, it will be evident that, while the handle 62 is in its usual forward positioning, the handle 61 may be moved to its left hand positioning, thereby closing the contacts 160 and establishing a path for current supply to the operation governing parts of the scanning mechanism (see also FIG. 7); whereupon, tablets may be stacked in the magazine SM61 and sensing thereof may proceed as and whenever desired.

When it is desired to render active the totalizers of one or the other of the cashiers, a suitable key should be inserted in the appropriate one of the locks 72, 73, and the handle 64 moved to the left if the lock 72 has been operated, and to the right if the lock 73 has been operated. The key can thereupon be removed from such lock, and the handle 64 will be retained in the positioning thus established. If the handle 64 is thus positioned to the left, the shutter 71′ will be withdrawn from the slot 52, and if to the right, the shutter 71″ will be withdrawn from the slot 53.

Thereafter, a cashier's card may be inserted through whichever of said slots is then open, and the attained aggregate expressed by the associated totalizer for the cashier represented by such open slot may then be printed upon such card by moving the handle 65 forwardly and then rearwardly; the card being anchored in position, and having its corners cut off, incident to such movements of the handle 65, in a manner analogous to that more fully explained with reference to the handle 63.

When such a printed record is obtained on the cashier's card at the end of the tour of duty of the cashier (a similar record having been printed on the card at the commencement of the activities of that cashier for the day) the final figures will be printed above such starting figures, and, upon subtracting said starting figures therefrom, it will disclose the amount for which that cashier should account at that time. It will, of course, be readily understood that the amount of cash in the drawer of that cashier, at the end of the current tour, should include the so-called "change-money" which was provided for the cashier at the commencement of the work period, in addition to the sum taken in, as indicated by the figures printed on the card.

It should be further understood that the handle 64 not only alternatively controls the shutters for the slots 52 and 53, but also causes prices ascertained by scanning of tablets stacked in magazine SM61 to be entered in the totalizer of the cashier represented by the positioning of the handle 64 at the time of such scanning. The positioning of the handle 64 also determines the cashier designation to be displayed by the target 46.

Interlocking mechanism should also be provided whereby the handle 64 cannot be moved from either of its extreme positions during activity of the scanning mechanism associated with the magazine SM61, and whereby such activity cannot be initiated or continued other than while the handle 64 is in one or the other of its extreme positions. Although such mechanism is not shown by the drawings and herein described in detail, its general structure and arrangement will be evident to those skilled in the art from the description herein given of the structure provided for preventing movement of the handle 61 from its left hand position, other than during inactivity of the scanning mechanism.

In use of an embodiment of this invention such as shown in FIG. 2, the utilization of the handles 61′, 62′, 63′, 64′ and 65′, and the results of such utilization, will be substantially the same as the manner and results of utilization of the similarly numbered handles shown in FIG. 1, as hereinbefore more fully described.

If tokens or tablets stacked in the magazine SM61 are to be processed, the handle SM701 should be placed in its left hand position; and, thereafter, the procedure will be substantially identical with that hereinbefore described with reference to FIG. 1.

If the manual keyboard 81 is to be used, the handle SM701 should be moved to its right hand position, and the keys of the mechanism 81 may then be operated.

For reasons hereinbefore stated in greater detail, the handle 61′ should be locked against movement from its left hand position, except when the handle SM701 is in its left hand position; and, furthermore, unless the analyzing mechanism associated with the magazine SM61 is then inactive. These two conditions being attained, the handles 61′, 62′ and 63′ may be utilized in a manner corresponding to the utilization of similarly designated handles shown in FIG. 1.

While detailed characteristics of various portions of the mechanism illustratively shown in the accompanying drawings and hereinbefore described collectively present a preferred embodiment of this invention, it should be understood that many matters of combination, arrangement, structure, design and detail may be modified without departing from this invention, and that, under various circumstances, less than all of such mechanism features may be utilized without others thereof, and that one or more of certain suitable prior art structures may be used more or less advantageously in place of one or another of the herein shown and described aforesaid mechanism portions.

As a single one of the many instances in which modification may be made of what is shown in the accompanying drawings and hereinbefore described, it should be understood that a single handle could be used in the place of the handles 61, 62 and 63 of FIG. 1, which handle would be retained in normal positioning, as by the lock 74, and would be subject to retention in its usual positioning as by a magnet such as 161 governed by contacts associated with the magazine SM61. Such handle would also control the scanning mechanism associated with said magazine, as by the use of contacts such as 160 separation of which would render such scanning mechanism inactive.

Parts being associated with such handle for effecting printing on the paper strip 201, advancement of such strip, and opening of the shutter 71 incident to the movement of such single handle a certain distance away from its usual positioning, and still further movement of such single handle would effect actuation of blocks such as 209, 209′, providing these blocks had been swung rearwardly as by a card 215, and such card would be anchored in position and its guide corners cut back through the action of mechanism analogous to that responsive to forward movement of the handle 63; it being evident that until a card had been so inserted as to swing said blocks rearwardly, the movement of such single handle would be arrested. Still further parts would be associated with such single handle whereby, after it had been moved from its usual positioning a maximum distance, the return of such handle to its intermediate position would cause printing of the totals on the inserted card and would cause release of such card from the anchoring punches. Such single handle could then be repeatedly moved from and to its intermediate positioning incident to insertion of additional cards; and, after desired number of cards had been printed upon, such handle would be restorable to its usual positioning, incidentally closing the slot through which cards could be otherwise inserted and, finally, again rendering the scanning mechanism operable. Such single handle further having associated parts analogous to those coacting with the structures moving with the handles 61, 62 and 63, whereby, after significant movement of such handle from its usual positioning, it could not be returned to such positioning until it had been moved at least to its intermediate positioning; and, furthermore, such that after significant movement beyond its intermediate positioning, it cannot be returned thereto until it has been moved substantially to maximum displacement from its usual positioning. Correspondingly analogous parts being provided for acting incident to significant extent of movement of such handle from positioning of maximum displacement until it reaches its intermediate positioning; and again, when moved to a significant extent from the intermediate positioning toward usual positioning, preventing return to intermediate positioning until usual positioning has been substantially reached.

In the light of the foregoing, it should be understood that this invention is not limited to the exact details of construction shown and described, for various modifications will occur to persons skilled in the art. Furthermore, it should be understood that aspects of this invention which, as a matter of language, might be said to fall between what is defined by the language of one or another of certain of the annexed claims are intended to be covered by such claims.

What is claimed is:

1. In a mechanism of the character described, the combination of means operable for printing, at a predetermined location, groups of characters disposed in a predetermined line and designating diverse alternative data expressions; structure providing a first path and a second path for travel therein of media upon which such character groups may be printed, said first path including said printing location and being suited for travel therein of a paper strip; said second path being suited for insertion therein and for travel therethrough of card-like media units upon which such designations may be printed, said second path also including said printing location and extending substantially at right angles to the aforesaid line in which data expressions are printed; governing mechanism subject to operative actuation by a user for causing operation of said printing means; said governing mechanism comprising a first action initiating part and a second action initiating part, each of said parts having an unactivated position and subject to a predetermined extent of movement therefrom; means for causing operation of said printing means by said first initiating part and by said second initiating part upon attainment of respective predetermined stages in the movements of said initiating parts; and means governed by said first initiating part for preventing movement of second part from unactivated to its printing position other than when said first initiating part has at least attained the aforesaid predetermined stage in its movement away from its unactivated position.

2. Mechanism in accordance with claim 1 having shift means controlled by the first action initiating part for effecting movement of a paper strip in the first path incident to a portion of the movement of said first initiating part subsequent to that portion which causes operation of the printing means, the extent of the movement so imparted to a paper strip being of extent sufficient to carry a printed line away from printing location.

3. Mechanism in accordance with claim 1 having blocking means comprising a shutter positionable for preventing insertion of intended record receptive media into the second path, means controlled by the first initiating part for effecting withdrawal of said shutter from the second path during the portion of the movement of the first initiating part away from its unactivated position subsequent to the aforesaid predetermined stage in the movement of said first initiating part and for effecting return of said shutter to its blocking position when said first initiating part is in its unactivated position.

4. Mechanism in accordance with claim 1 having means controlled by the second initiating part for causing a media unit situated in the second path to be anchored against displacement throughout a portion of the movement of the second initiating part preceding and continuing until after attainment of the stage in the movement of the second initiating part at which it causes operation of the printing means.

5. Mechanism in accordance with claim 1 having detent means normally preventing movements of the second initiating part from its unactivated position to the aforesaid predetermined extent which causes operation of the printing mechanism, mechanism governing the effectiveness of said detent means, said governing mechanism involving two parts, each of said parts having an element in said second path of movement, said parts being operable to disable said detent means upon engagement of said elements by leading edge of a media unit inserted in said second path, said detent means further involving means for limiting the extent of the travel of such media units during insertion thereof through the second path.

6. Mechanism in accordance with claim 5 in which there is associated with each of the two elements cutting-away means for a respective portion of the leading edge of a media, when said unit is in position for printing during that portion of the cycle of the movement of the second initiating part during which printing is accomplished, the portions cut away being those in the path of which the governing mechanism parts are situated.

7. Mechanism in accordance with claim 6 in which disablement of the detent means is attained only responsive to simultaneous engagement of the parts by previously cut-away portions of the leading edge of a media unit incident to insertion thereof through the second path.

8. Mechanism in accordance with claim 7 in which the relationship of the cutting-away means of one of the elements to that of the other is such that the release of the detent means of both of said elements will be accomplished responsive to their engagement by respective previously cut-away portions of the leading edge of a unit, only while such unit is the same side up as when such portions were cut away.

9. Mechanism in accordance with claim 1 having means for preventing movement of said first initiating part from activated to unactivated positioning other than during unactivated positioning of said second initiating part.

10. Mechanism in accordance with claim 1 having means for preventing movement of the first initiating part from activated position to unactivated position other than when the second initiating part is in unactivated position.

11. Mechanism in accordance with claim 1 having a selecting part having an unactivated position and a predetermined cycle of movement therefrom, and means for permitting a significant extent of movement of said first initiating part from its unactivated position only during activated positioning of said selecting part.

12. Mechanism in accordance with claim 11 having means for permitting movement of the selecting part from its activated position only during unactivated positioning of the first initiating part.

13. Mechanism in accordance with claim 11 having means for preventing movement of the selecting part from activated position to unactivated position other than when the first initiating part is in unactivated position.

14. In a mechanism of the character described, the combination of means operable for printing, at a predetermined location, groups of aligned characters designating data expressions, structure providing a path including said predetermined location and suited for insertion therein and for travel therethrough of card-like media units upon which such data expressions may be printed, governing mechanism comprising a part movable from an unactivated position for causing operation of said printing means in a predetermined portion of such movement, and means for preventing a significant extent of movement of said governing mechanism part from its unactivated position other than when a media unit is positioned for marking intended characters thereon by said printing means, and means, comprising a punch, for causing a media situated in the path to be anchored against displacement throughout a portion of the movement of the governing mechanism preceding and continuing until after that portion of such movement which causes operation of the printing means.

15. In a mechanism of the character described having means conditionable in accordance with diverse alternative data expressions, the combination comprising means for printing groups of characters expressive of such data expressions structure providing a path suitable for insertion therein and for travel therethrough of card-like media units upon which such characters may be printed, governing mechanism comprising a part having an unactivated position and a predetermined cycle of movement therefrom, means controlled by said governing mechanism for causing operation of said printing mechanism incident to attainment of a predetermined stage in the cycle of the movement of said governing mechanism, means responsive to said governing mechanism for anchoring such a media unit against displacement, said anchoring means comprising punches remotely spaced transversely of said path, and means controlled by said governing mechanism for causing said punches to penetrate such a media unit incident to attainment of a stage of the movement cycle of said governing mechanism part previous to that stage which causes operation of the printing means and for causing withdrawal of said punches from such media unit at a stage of said cycle subsequent to that which causes operation of the printing means.

16. Mechanism in accordance with claim 15 having means for preventing return of the governing mechanism part to its unactivated position after said part has been moved to a significant extent away from said position.

17. Mechanism in accordance with claim 15 having means for preventing movement of the governing mechanism part toward its activated position after said part has been moved therefrom to a significant extent.

References Cited in the file of this patent

UNITED STATES PATENTS

| | | |
|---|---|---|
| 1,202,800 | Carroll | Oct. 31, 1916 |
| 1,219,445 | Ellis | Mar. 20, 1917 |
| 1,592,728 | Ens | July 13, 1926 |
| 1,786,454 | Robertson | Dec. 30, 1930 |
| 1,864,228 | Berger | June 21, 1932 |
| 2,029,803 | Wheelbarger | Feb. 4, 1936 |
| 2,071,141 | Placke | Feb. 16, 1937 |
| 2,174,571 | Eller | Oct. 3, 1939 |
| 2,281,577 | Haynes | May 5, 1942 |
| 2,343,268 | Wheeler | Mar. 7, 1944 |
| 2,539,949 | Ericsson | Jan. 30, 1951 |
| 2,587,019 | Werner | Feb. 26, 1952 |
| 2,591,448 | Lorenz | Apr. 1, 1952 |
| 2,690,872 | Aurbach | Oct. 5, 1954 |
| 2,691,938 | Bliss | Oct. 19, 1954 |
| 2,698,139 | Goodbar et al. | Dec. 28, 1954 |
| 2,730,039 | Werner | Jan. 10, 1956 |